(12) United States Patent
Maki et al.

(10) Patent No.: US 7,526,144 B2
(45) Date of Patent: Apr. 28, 2009

(54) IMAGE PROCESSING METHOD, IMAGE EXPANSION METHOD, IMAGE OUTPUT METHOD, IMAGE CONVERSION METHOD, IMAGE PROCESSING APPARATUS, IMAGE EXPANSION APPARATUS, IMAGE OUTPUT APPARATUS, IMAGE CONVERSION APPARATUS, AND COMPUTER-READABLE STORAGE MEDIUM

(75) Inventors: Takashi Maki, Kanagawa (JP); Taku Kodama, Kanagawa (JP); Keiichi Suzukii, Tokyo (JP); Ikuko Yamashiro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1043 days.

(21) Appl. No.: 10/783,632

(22) Filed: Feb. 20, 2004

(65) Prior Publication Data

US 2004/0165780 A1   Aug. 26, 2004

(30) Foreign Application Priority Data

Feb. 20, 2003  (JP)  ............................. 2003-042792
Mar. 20, 2003  (JP)  ............................. 2003-077393

(51) Int. Cl.
*G06K 9/60* (2006.01)
(52) U.S. Cl. .................. 382/305; 382/243; 382/284
(58) Field of Classification Search ................ 382/243, 382/284, 298, 305
See application file for complete search history.

(56) References Cited

U.S. PATENT DOCUMENTS 5,761,655 A * 6/1998 Hoffman ....................... 707/4
6,202,061 B1 * 3/2001 Khosla et al. .................. 707/3
6,567,119 B1 * 5/2003 Parulski et al. ........... 348/207.2
6,591,068 B1 * 7/2003 Dietz ......................... 396/429
6,623,528 B1 * 9/2003 Squilla et al. ............... 715/202
6,668,134 B1 * 12/2003 Niikawa ..................... 386/95
6,690,843 B1 * 2/2004 Squilla et al. ............... 382/306
7,099,559 B1 * 8/2006 Niikawa et al. .............. 386/94
7,154,543 B1 * 12/2006 Shiohara .................. 348/231.2
7,170,552 B2 * 1/2007 Parulski et al. ........... 348/207.2

FOREIGN PATENT DOCUMENTS

| JP | 08-320945 | 12/1996 |
|---|---|---|
| JP | 11-317833 | 11/1999 |
| JP | 2000-082127 | 3/2000 |
| JP | 2001-229391 | 8/2001 |
| JP | 2001-257979 A | 9/2001 |
| JP | 2001-258031 A | 9/2001 |
| JP | 2002-058025 A | 2/2002 |

OTHER PUBLICATIONS

Nomizu, Yasuyuki, "Next-Generation Image Coding Method JPEG2000," Ticeps, Feb. 13, 2001.
Japanese Office Action for JP Appln. No. 2003-042792, Issue date Aug. 7, 2007 (2 pages).

* cited by examiner

*Primary Examiner*—Yosef Kassa
(74) *Attorney, Agent, or Firm*—Blakely, Sokoloff, Taylor & Zafman LLP

(57) ABSTRACT

An image processing method generating a single image group file from a plurality of still images, by setting an output sequence of the plurality of still images, and adding data indicating a storage location of each of the still images according to the set output sequence, to a header portion of the file.

36 Claims, 25 Drawing Sheets

FIG.3
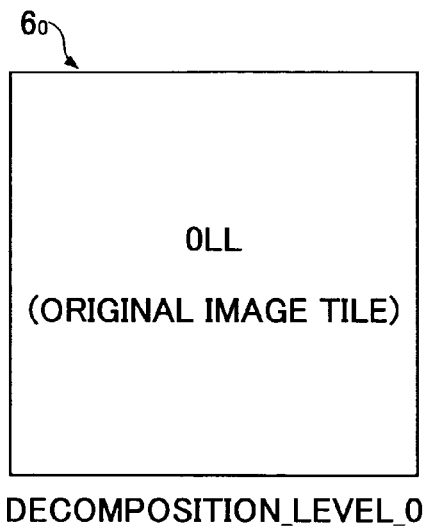
DECOMPOSITION_LEVEL_0
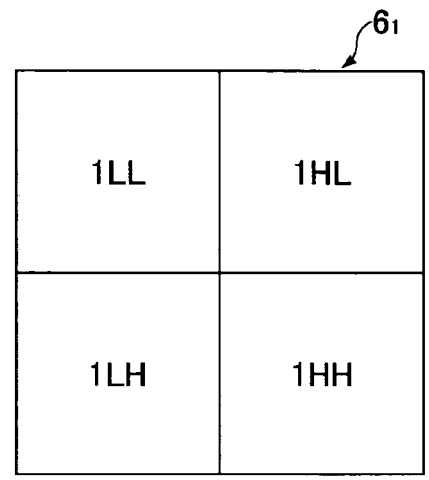
DECOMPOSITION_LEVEL_1
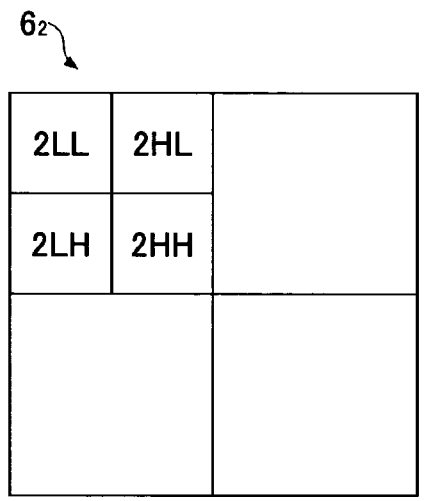
DECOMPOSITION_LEVEL_2
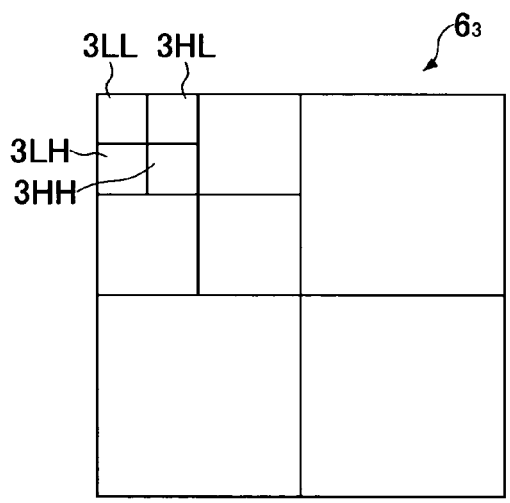
DECOMPOSITION_LEVEL_3

FIG.6

| SUB-BAND | PRECINCT No. | | | | | | | | | | | | |
|---|---|---|---|---|---|---|---|---|---|---|---|---|---|
| 1HH | 8 | 51 | 72 | 93 | 114 | 135 | 156 | 177 | 198 | 215 | 228 | | |
| | 7 | 50 | 71 | 92 | 113 | 134 | 155 | 176 | 197 | 214 | 227 | | |
| | 6 | 49 | 70 | 91 | 112 | 133 | 154 | 175 | 196 | 213 | 226 | | |
| | 5 | 48 | 69 | 90 | 111 | 132 | 153 | 174 | 195 | 212 | 225 | | |
| | 4 | 47 | 68 | 89 | 110 | 131 | 152 | 173 | 194 | 211 | 224 | | |
| | 3 | 46 | 67 | 88 | 109 | 130 | 151 | 172 | 193 | 210 | 223 | | |
| | 2 | 45 | 66 | 87 | 108 | 129 | 150 | 171 | 192 | 209 | 222 | | |
| | 1 | 44 | 65 | 86 | 107 | 128 | 149 | 170 | 191 | 208 | 221 | | |
| | 0 | 43 | 64 | 85 | 106 | 127 | 148 | 169 | 190 | 207 | 220 | | |
| 1LH | 8 | 42 | 72 | 93 | 114 | 135 | 156 | 177 | 198 | 215 | 228 | | |
| | 7 | 41 | 71 | 92 | 113 | 134 | 155 | 176 | 197 | 214 | 227 | | |
| | 6 | 40 | 70 | 91 | 112 | 133 | 154 | 175 | 196 | 213 | 226 | | |
| | 5 | 39 | 69 | 90 | 111 | 132 | 153 | 174 | 195 | 212 | 225 | | |
| | 4 | 38 | 68 | 89 | 110 | 131 | 152 | 173 | 194 | 211 | 224 | | |
| | 3 | 37 | 67 | 88 | 109 | 130 | 151 | 172 | 193 | 210 | 223 | | |
| | 2 | 36 | 66 | 87 | 108 | 129 | 150 | 171 | 192 | 209 | 222 | | |
| | 1 | 35 | 65 | 86 | 107 | 128 | 149 | 170 | 191 | 208 | 221 | | |
| | 0 | 34 | 64 | 85 | 106 | 127 | 148 | 169 | 190 | 207 | 220 | | |
| 1HL | 8 | 33 | 72 | 93 | 114 | 135 | 156 | 177 | 198 | 215 | 228 | | |
| | 7 | 32 | 71 | 92 | 113 | 134 | 155 | 176 | 197 | 214 | 227 | | |
| | 6 | 31 | 70 | 91 | 112 | 133 | 154 | 175 | 196 | 213 | 226 | | |
| | 5 | 30 | 69 | 90 | 111 | 132 | 153 | 174 | 195 | 212 | 225 | | |
| | 4 | 29 | 68 | 89 | 110 | 131 | 152 | 173 | 194 | 211 | 224 | | |
| | 3 | 28 | 67 | 88 | 109 | 130 | 151 | 172 | 193 | 210 | 223 | | |
| | 2 | 27 | 66 | 87 | 108 | 129 | 150 | 171 | 192 | 209 | 222 | | |
| | 1 | 26 | 65 | 86 | 107 | 128 | 149 | 170 | 191 | 208 | 221 | | |
| | 0 | 25 | 64 | 85 | 106 | 127 | 148 | 169 | 190 | 207 | 220 | | |
| 2HH | 3 | 7 | 15 | 63 | 84 | 105 | 126 | 147 | 168 | 189 | 206 | 219 | |
| | 2 | 6 | 14 | 62 | 83 | 104 | 125 | 146 | 167 | 188 | 205 | 218 | |
| | 1 | 5 | 13 | 61 | 82 | 103 | 124 | 145 | 166 | 187 | 204 | 217 | |
| | 0 | 4 | 12 | 60 | 81 | 102 | 123 | 144 | 165 | 186 | 203 | 216 | |
| 2LH | 3 | 7 | 15 | 23 | 59 | 80 | 101 | 122 | 143 | 164 | 185 | 202 | |
| | 2 | 6 | 14 | 22 | 58 | 79 | 100 | 121 | 142 | 163 | 184 | 201 | |
| | 1 | 5 | 13 | 21 | 57 | 78 | 99 | 120 | 141 | 162 | 183 | 200 | |
| | 0 | 4 | 12 | 20 | 56 | 77 | 98 | 119 | 140 | 161 | 182 | 199 | |
| 2HL | 3 | 7 | 15 | 63 | 59 | 80 | 101 | 122 | 143 | 164 | 185 | 202 | |
| | 2 | 6 | 14 | 62 | 58 | 79 | 100 | 121 | 142 | 163 | 184 | 201 | |
| | 1 | 5 | 13 | 61 | 57 | 78 | 99 | 120 | 141 | 162 | 183 | 200 | |
| | 0 | 4 | 12 | 20 | 56 | 77 | 98 | 119 | 140 | 161 | 182 | 190 | |
| 2LL | 3 | 3 | 11 | 19 | 27 | 55 | 76 | 97 | 118 | 139 | 160 | 181 | |
| | 2 | 2 | 10 | 18 | 26 | 54 | 75 | 96 | 117 | 138 | 159 | 180 | |
| | 1 | 1 | 9 | 17 | 25 | 53 | 74 | 95 | 116 | 137 | 158 | 179 | |
| | 0 | 0 | 8 | 16 | 24 | 52 | 73 | 94 | 115 | 136 | 157 | 178 | |

BIT PLANE / SUB-BIT PLANE:
- MSB — Code Of Bit 12
- Code Of Bit 11 — Cleanup
- Code Of Bit 10 — Significant / Refinement / Cleanup
- Code Of Bit 9 — Significant / Refinement / Cleanup
- Code Of Bit 8 — Significant / Refinement / Cleanup
- Code Of Bit 7 — Significant / Refinement / Cleanup
- Code Of Bit 6 — Significant / Refinement / Cleanup
- Code Of Bit 5 — Significant / Refinement / Cleanup
- Code Of Bit 4 — Significant / Refinement / Cleanup
- Code Of Bit 3 — Significant / Refinement / Cleanup
- Code Of Bit 2 — Significant / Refinement / Cleanup
- Code Of Bit 1 — Significant / Refinement / Cleanup
- LSB

FIG.7

| SUB-BAND | 2LL | 2HL | | | | 2LH | | | | 2HH | | | | 1HL | | | | | | | | | 1LH | | | | | | | | | 1HH | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| PRECINCT No. | 0 | 1 | 2 | 3 | 0 | 1 | 2 | 3 | 0 | 1 | 2 | 3 | 0 | 1 | 2 | 3 | 4 | 5 | 6 | 7 | 8 | 0 | 1 | 2 | 3 | 4 | 5 | 6 | 7 | 8 | 0 | 1 | 2 | 3 | 4 | 5 | 6 | 7 | 8 |

(Table of coefficient values showing bit planes from MSB (Code Of Bit 12, 11) through LSB (Code Of Bit 1), with sub-bit planes Cleanup / Significant / Refinement / Cleanup)

Legend:
- LAYER 0
- LAYER 1
- LAYER 2
- LAYER 3
- LAYER 4
- LAYER 5
- LAYER 6
- LAYER 7
- LAYER 8
- LAYER 9

THUMBNAIL FOR DIGITAL CAMERA
THUMBNAIL FOR IMAGE VIEWER SOFTWARE
2LL THUMBNAIL FOR PORTABLE TEL

IMAGE PROCESSING METHOD, IMAGE EXPANSION METHOD, IMAGE OUTPUT METHOD, IMAGE CONVERSION METHOD, IMAGE PROCESSING APPARATUS, IMAGE EXPANSION APPARATUS, IMAGE OUTPUT APPARATUS, IMAGE CONVERSION APPARATUS, AND COMPUTER-READABLE STORAGE MEDIUM

The present application claims priority to the corresponding Japanese Application Nos. 2003-042792, filed on Feb. 20, 2003 and 2003-077393, filed on Mar. 20, 2003, the entire contents of which are hereby incorporated by reference.

BACKGROUND OF THE INVENTION

This application claims the benefit of Japanese Patent Applications No. 2003-042792 filed Feb. 20, 2003 and No. 2003-077393 filed Mar. 20, 2003, in the Japanese Patent Office, the disclosures of which are hereby incorporated by reference.

FIELD OF THE INVENTION

The present invention generally relates to, and more particularly to image processing methods, image expansion methods, image output methods, image conversion methods, image processing apparatuses, image expansion apparatuses, image output apparatuses, image conversion apparatuses and computer-readable storage media, and more particularly to an image processing method, an image expansion method, an image output method, an image conversion method, an image processing apparatus, an image expansion apparatus, an image output apparatus, an image conversion apparatus and a computer-readable storage medium that are suited for processing image data in an easily manageable and/or outputtable manner.

DESCRIPTION OF THE RELATED ART

In conventional silver (or reversal) films, raw data obtained by picking up images by a camera are managed in the form of "negatives" each made up of a group of a plurality of pictures. The number of pictures grouped in the negative is determined during the film manufacturing stage, and for this reason, it is not always possible to group the pictures according to the image contents. However, since the pictures in the negative are arranged in the order taken, a kind of automatic grouping of the pictures is made that reflects the image contents to a certain extent.

On the other hand, the JPEG2000 (ISO/IEC FCD 15444-1) has been standardized as a next-generation image encoding system of JPEG with respect to digital cameras. Image encoding method and apparatus, a signal transmission method, and image decoding method and apparatus have been proposed in relation to the JPEG2000 in a Japanese Laid-Open Patent Application No. 2001-257979, for example. In addition, a signal processing method, an image encoding apparatus and an image decoding apparatus that utilize vacant bits within the code by embedding various information in the vacant bits within the code that is prescribed by the JPEG2000 encoding standard, have been proposed in a Japanese Laid-Open Patent Application No. 2001-258031, for example. Furthermore, signal processing method and apparatus, and a file generation method that record meta data and the like in a file separate from a codestream file, have been proposed in a Japanese Laid-Open Patent Application No. 2002-058025, for example.

According to the JPEG2000, it is possible to store the image in a high-definition state, and it is possible to obtain from the encoded image data an image having a specific resolution or an image having a specific picture quality. Hence, it is possible to output (display, print or transmit) a thumbnail image at a high speed by utilizing these features. Conventionally, a thumbnail of an image is often displayed on an image display apparatus. However, since it has become possible to output the thumbnail image at a high speed according to the JPEG2000, there are increased opportunities not only to display but also print and transmit the thumbnail image.

FIG. 14B is a diagram for illustrating a thumbnail output according to a conventional method. FIG. 14B shows a case where the thumbnail is stored by the conventional method that is standardized by Exchangeable image file format (Exif) or the like. As may be seen from a compressed encoded data 35 shown in FIG. 14B, a small image 37 for the thumbnail must be embedded within a header region 36, separately from the data of a main image 38. Although a high-speed thumbnail output is possible, it takes time to acquire the data because the data capacity becomes large. Moreover, in the case of the Exif, no method has been provided to include a plurality of still images.

However, none of the conventional methods efficiently group the pictures in order to enable image retrieval based on the day the picture was taken, the place where the picture was taken, and the like. Accordingly, it is not easy to manage and/or retrieve image data in sets of a plurality of pictures. In addition, when making a thumbnail output, the method of inserting the thumbnail image in the header portion of each still image requires time to make the data transfer, and it is not easy to make a thumbnail output of the sets of a plurality of pictures of the same kind and confirm the sets.

SUMMARY OF THE INVENTION

An image processing method, image expansion method, image output method, image conversion method, image processing apparatus, image expansion apparatus, image output apparatus, image conversion apparatus, and computer-readable storage medium are described. In one embodiment, the image processing method for generating a single image group file from a plurality of still images comprises setting an output sequence of the plurality of still images and adding data indicating a storage location of each of the still images according to the set output sequence, to a header portion of the file.

BRIEF DESCRIPTION OF THE DRAWINGS

FIG. 3 is a diagram for illustrating sub-bands at each decomposition level when there are 3 decomposition levels;

FIG. 6 is a diagram showing a general layer structure, for illustrating packets and layers for a case where the number of decomposition levels is 2;

FIG. 7 is a diagram showing a layer structure that enables a thumbnail output depending on each of a plurality of equipments, for illustrating the packets and the layers for a case where the number of decomposition levels is 2;

FIG. 8 is a diagram showing a layer structure that enables a thumbnail output depending on a transmission line capacity, for illustrating the packets and the layers for a case where the number of decomposition levels is 2;

DESCRIPTION OF THE PREFERRED EMBODIMENTS

Figure 1:
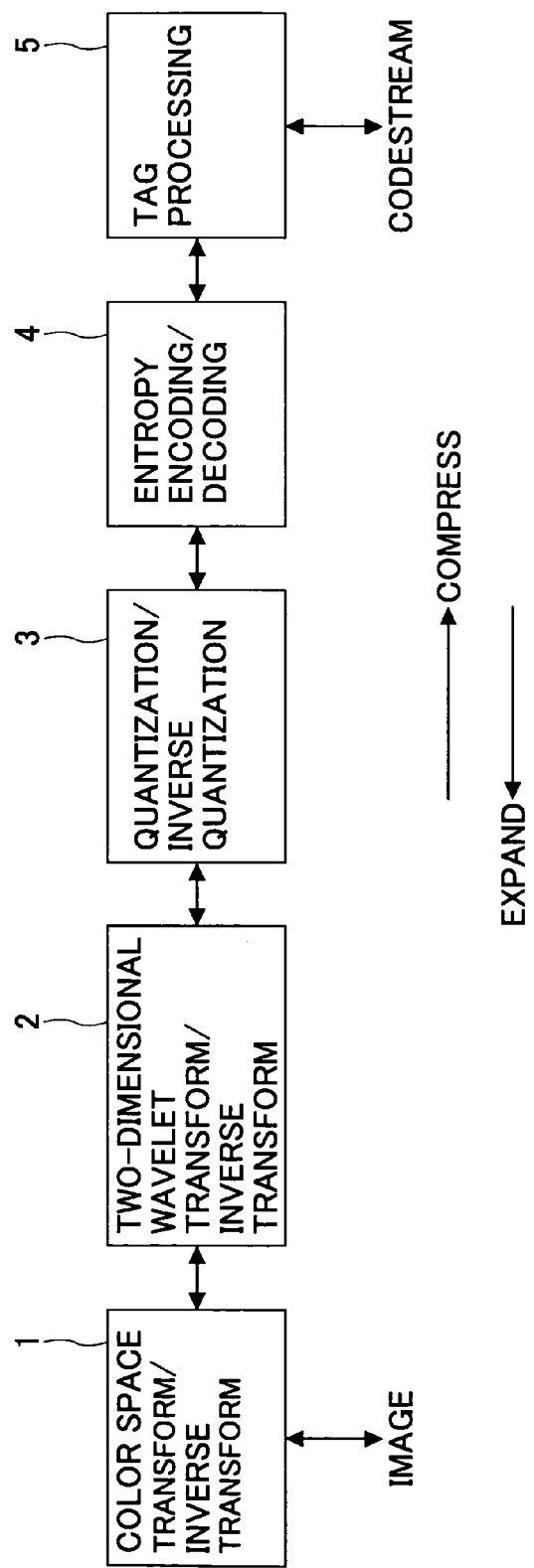
FIG. 1 is a functional block diagram showing a system for realizing the hierarchical encoding algorithm that forms a basis of the JPEG2000 that is used in the embodiments.

Accordingly, one or more embodiments of the present invention include a novel and useful image processing method, image expansion method, image output method, image conversion method, image processing apparatus, image expansion apparatus, image output apparatus, image conversion apparatus and computer-readable storage medium, in which the problems described above are eliminated.

Other embodiments of the present invention include an image processing method, an image processing apparatus and a computer-readable storage medium, which can easily manage a plurality of still images in a single file that groups the plurality of still images.

Other embodiments of the present invention include an image output method, an image output apparatus and a computer-readable storage medium, which can output a single file that groups a plurality of still images according to a set order.

Other embodiments of the present invention include an image processing method, an image processing apparatus and a computer-readable storage medium, which generate a single file that groups a plurality of compressed image data that enable a thumbnail of image data to be output at a high speed without increasing the data capacity of the compressed image data.

Other embodiments of the present invention include an image expansion method, an image output method, an image expansion apparatus, an image output apparatus and a computer-readable storage medium, which can output a thumbnail of each image data in an order at a high speed, without increasing the data capacity of each compressed image data, with respect to a single file that groups a plurality of images.

Other embodiments of the present invention include an image conversion method, an image conversion apparatus and a computer-readable storage medium, which can generate, from a single file that groups a plurality of still images, each still image as an individual file.

Another embodiment of the present invention includes an image processing method for generating a single image group file from a plurality of still images comprising setting an output sequence of the plurality of still images; and adding data indicating a storage location of each of the still images according to the set output sequence, to a header portion of the file. According to the image processing method of one embodiment of the present invention, it is possible to easily manage the plurality of still images by grouping the still images into a single file.

The image processing method may further comprise an image compression step to generate compressed coded data of the plurality of still images, and the data adding step may comprise a thumbnail setting step to set thumbnail information of each of the still images in one or a plurality of formats, and a thumbnail information adding step to add the thumbnail information with the set format in the header portion when forming the coded data of each of the still images. In this case, it is possible to generate a file that groups a plurality of compressed image data that enable a high-speed output of the thumbnail of the image data, without increasing the data capacity of the compressed image data.

Another embodiment of the present invention includes an image processing apparatus for generating a single image group file from a plurality of still images, comprising an image sequence setting unit to set an output sequence of the plurality of still images; and a data adding unit to add data indicating a storage location of each of the still images according to the set output sequence, to a header portion of the file. According to the image processing apparatus of one embodiment of the present invention, it is possible to easily manage the plurality of still images by grouping the still images into a single file.

The image processing apparatus may further comprise an image compression unit to generate compressed coded data of the plurality of still images, and the data adding unit may comprise a thumbnail setting unit to set thumbnail information of each of the still images in one or a plurality of formats, and a thumbnail information adding unit to add the thumbnail information with the set format in the header portion when forming the coded data of each of the still images. In this case, it is possible to generate a file that groups a plurality of compressed image data that enable a high-speed output of the thumbnail of the image data, without increasing the data capacity of the compressed image data.

Another embodiment of the present invention includes an image expansion method for outputting a thumbnail of an image, comprising an obtaining step to obtain compressed coded data by generating a single image group file from a plurality of still images, comprising setting an output sequence of the plurality of still images, adding data indicating a storage location of each of the still images according to the set output sequence to a header portion of the file, and generating the compressed coded data of the plurality of still images, where adding data includes setting thumbnail information of each of the still images in one or a plurality of formats and adding the thumbnail information with the set format in the header portion when forming the coded data of each of the still images, and where the thumbnail information includes resolution information of the still images; and an expansion and output step to expand and output only a thumbnail portion of the compressed coded data, based on the thumbnail information of the compressed coded data. According to the image expansion method of one embodiment of the present invention, it is possible to output the thumbnail of each still image data in a sequence at a high speed, without increasing the data capacity of each compressed image data, with respect to the file that groups the plurality of still images.

Another embodiment of the present invention includes an image expansion apparatus for outputting a thumbnail of an image, comprising an obtaining unit to obtain compressed coded data by generating a single image group file from a plurality of still images, the obtaining unit comprising an image sequence setting unit to set an output sequence of the plurality of still images, a data adding unit to add data indicating a storage location of each of the still images according to the set output sequence to a header portion of the file, and an image compression unit to generate the compressed coded data of the plurality of still images, where the data adding unit includes a thumbnail setting unit to set thumbnail information of each of the still images in one or a plurality of formats and a thumbnail information adding unit to add the thumbnail information with the set format in the header portion when forming the coded data of each of the still images, and where the thumbnail information includes resolution information of the still images; and an expansion and output unit to expand and output only a thumbnail portion of the compressed coded data, based on the thumbnail information of the compressed coded data. According to the image expansion apparatus of one embodiment of the present invention, it is possible to output the thumbnail of each still image data in a sequence at a high speed, without increasing the data capacity of each compressed image data, with respect to the file that groups the plurality of still images.

Another embodiment of the present invention includes an image output method for extracting a thumbnail of an image, comprising an obtaining step to obtain compressed coded data by generating a single image group file from a plurality of still images, comprising setting an output sequence of the plurality of still images, adding data indicating a storage location of each of the still images according to the set output sequence to a header portion of the file, and generating the compressed coded data of the plurality of still images, where adding the data includes setting thumbnail information of each of the still images in one or a plurality of formats and adding the thumbnail information with the set format in the header portion when forming the coded data of each of the still images, and where the thumbnail information including resolution information of the still images; and an extracting step to extract a portion of the compressed coded data based on the thumbnail information of the compressed coded data. According to the image output method of one embodiment of the present invention, it is possible to output the file that groups the plurality of still images according to the set output sequence, and enable a high-speed output of the thumbnail of the image data, without increasing the data capacity of the compressed image data.

Another embodiment of the present invention includes an image output method comprising an obtaining step to obtain a single image group file from a plurality of still images, comprising setting an output sequence of the plurality of still images, and adding data indicating a storage location of each of the still images according to the set output sequence to a header portion of the file; and an output step to output the plurality of still images of the file according to the output sequence. According to the image output method of one embodiment of the present invention, it is possible to output the file that groups the plurality of still images according to the set output sequence.

Another embodiment of the present invention includes an image output apparatus for extracting a thumbnail of an image, comprising an obtaining unit to obtain compressed coded data by generating a single image group file from a plurality of still images, the obtaining unit comprising a setting unit to set an output sequence of the plurality of still images, an adding unit to add data indicating a storage location of each of the still images according to the set output sequence to a header portion of the file, and a compression unit to generate the compressed coded data of the plurality of still images, where the adding unit sets thumbnail information of each of the still images in one or a plurality of formats and adds the thumbnail information with the set format in the header portion when forming the coded data of each of the still images, and where the thumbnail information includes resolution information of the still images; and an extracting unit to extract only a portion of the compressed coded data based on the thumbnail information of the compressed coded data. According to the image output apparatus of one embodiment of the present invention, it is possible to output the file that groups the plurality of still images according to the set output sequence, and enable a high-speed output of the thumbnail of the image data, without increasing the data capacity of the compressed image data.

Another embodiment of the present invention includes an image output apparatus comprising an obtaining unit to obtain a single image group file from a plurality of still images, the obtaining unit comprising a unit to set an output sequence of the plurality of still images, and a unit to add data indicating a storage location of each of the still images according to the set output sequence to a header portion of the file; and an output unit to output the plurality of still images of the file according to the output sequence. According to the image output apparatus of one embodiment of the present invention, it is possible to output the file that groups the plurality of still images according to the set output sequence.

Another embodiment of the present invention includes an image conversion method comprising an obtaining step to obtain a single image group file from a plurality of still images, comprising setting an output sequence of the plurality of still images, and adding data indicating a storage location of each of the still images according to the set output sequence to a header portion of the file; and a conversion step to subject the file to an inverse conversion so that the file is converted into the plurality of still images and one file is formed by each of the plurality of converted still images. According to the image conversion method of one embodiment of the present invention, it is possible to generate individual files of each still image, from the file that groups the plurality of still images.

Another embodiment of the present invention includes an image conversion apparatus comprising an obtaining unit to obtain a single image group file from a plurality of still images, the obtaining unit comprising a unit to set an output sequence of the plurality of still images, and a unit to add data indicating a storage location of each of the still images according to the set output sequence to a header portion of the file; and a conversion unit to subject the file to an inverse conversion so that the file is converted into the plurality of still images and one file is formed by each of the plurality of converted still images. According to the image conversion apparatus of one embodiment of the present invention, it is possible to generate individual files of each still image, from the file that groups the plurality of still images.

Another embodiment of the present invention includes a computer-readable storage medium that stores a program for causing a computer to generate a single image group file from a plurality of still images, the program comprising an image sequence setting procedure causing the computer to set an output sequence of the plurality of still images; and a data adding procedure causing the computer to add data indicating a storage location of each of the still images according to the set output sequence, to a header portion of the file. According to the computer-readable storage medium of one embodiment of the present invention, it is possible to easily manage the plurality of still images by grouping the still images into a single file.

Still another embodiment of the present invention includes a computer-readable storage medium that stores a program for causing a computer to output a thumbnail of an image, the program comprising an obtaining procedure causing the computer to obtain compressed coded data by generating a single image group file from a plurality of still images, comprising causing the computer to set an output sequence of the plurality of still images, causing the computer to add data indicating a storage location of each of the still images according to the set output sequence to a header portion of the file, and causing the computer to generate the compressed coded data of the plurality of still images, where adding data includes causing the computer to set thumbnail information of each of the still images in one or a plurality of formats and add the thumbnail information with the set format in the header portion when forming the coded data of each of the still images, and where the thumbnail information including resolution information of the still images; and an expansion and output procedure causing the computer to expand and output only a thumbnail portion of the compressed coded data, based on the thumbnail information of the compressed coded data. According to the computer-readable storage medium of one embodiment of the present invention, it is possible to output the thumbnail of each still image data in a sequence at a high speed, without increasing the data capacity of each compressed image data, with respect to the file that groups the plurality of still images.

Another embodiment of the present invention includes a computer-readable storage medium that stores a program for causing the computer to extract a thumbnail of an image, the program comprising an obtaining procedure causing the computer to obtain compressed coded data by generating a single image group file from a plurality of still images, comprising causing the computer to set an output sequence of the plurality of still images, causing the computer to add data indicating a storage location of each of the still images according to the set output sequence to a header portion of the file, and causing the computer to generate the compressed coded data of the plurality of still images, where adding data includes causing the computer to set thumbnail information of each of the still images in one or a plurality of formats and add the thumbnail information with the set format in the header portion when forming the coded data of each of the still images, and where the thumbnail information including resolution information of the still images; and an extracting procedure causing the computer to extract a portion of the compressed coded data based on the thumbnail information of the compressed coded data. According to the computer-readable storage medium of one embodiment of the present invention, it is possible to output the file that groups the plurality of still images according to the set output sequence, and enable a high-speed output of the thumbnail of the image data, without increasing the data capacity of the compressed image data.

Another embodiment of the present invention includes a computer-readable storage medium that stores a program for causing a computer to output a file, the program comprising an obtaining procedure causing the computer to obtain a single image group file from a plurality of still images, comprising causing the computer to set an output sequence of the plurality of still images, and add data indicating a storage location of each of the still images according to the set output sequence to a header portion of the file; and an output procedure causing the computer to output the plurality of still images of the file according to the output sequence. According to the computer-readable storage medium of one embodiment of the present invention, it is possible to output the file that groups the plurality of still images according to the set output sequence.

Another embodiment of the present invention includes a computer-readable storage medium that stores a program for causing a computer to convert a file, the program comprising an obtaining procedure causing the computer to obtain a single image group file from a plurality of still images, comprising causing the computer to set an output sequence of the plurality of still images, and add data indicating a storage location of each of the still images according to the set output sequence to a header portion of the file; and a conversion procedure causing the computer to subject the file to an inverse conversion so that the file is converted into the plurality of still images and one file is formed by each of the plurality of converted still images. According to the computer-readable storage medium of one embodiment of the present invention, it is possible to generate individual files of each still image, from the file that groups the plurality of still images.

Another embodiment of the present invention includes an image processing method for generating a single dynamic image file from a plurality of still images, comprising an image sequence setting step to set a reproducing sequence of the plurality of still images; and a data adding step to add data indicating a storage location of each of the still images according to the set output sequence, to a header portion of the file. According to the image processing method of one embodiment of the present invention, it is possible to output a thumbnail of a dynamic image at a high speed, when treating consecutive still images as the dynamic image.

Another embodiment of the present invention includes an image processing apparatus for generating a single dynamic image file from a plurality of still images, comprising an image sequence setting unit to set a reproducing sequence of the plurality of still images; and a data adding unit to add data indicating a storage location of each of the still images according to the set output sequence, to a header portion of the file. According to the image processing apparatus of one embodiment of the present invention, it is possible to output a thumbnail of a dynamic image at a high speed, when treating consecutive still images as the dynamic image.

Still another embodiment of the present invention includes an image expansion method for outputting a thumbnail of an image, comprising an obtaining step to obtain a series of compressed coded data by generating a single dynamic image file from a plurality of still images, comprising setting a reproducing sequence of the plurality of still images, adding data indicating a storage location of each of the still images according to the set output sequence to a header portion of the file, and generating compressed coded data of the plurality of still images, where adding data includes setting thumbnail information of each of the still images in one or a plurality of formats and adding the thumbnail information with the set format in the header portion when forming the coded data of each of the still images; and an expansion and output step to expand and output only a thumbnail portion of the compressed coded data, based on the thumbnail information of each of the compressed coded data. According to the image expansion method of one embodiment of the present invention, it is possible to output a dynamic image thumbnail at a high speed, when treating consecutive thumbnails of individual still image data as the dynamic image thumbnail, without increasing the data capacity of the individual compressed image data, with respect to the dynamic image made up of consecutive still images.

Another embodiment of the present invention includes an image expansion apparatus for outputting a thumbnail of an image, comprising an obtaining unit to obtain a series of compressed coded data by generating a single dynamic image file from a plurality of still images, the obtaining unit comprising an image sequence setting unit to set a reproducing sequence of the plurality of still images, a data adding unit to add data indicating a storage location of each of the still images according to the set output sequence to a header portion of the file, and an image compression unit to generate compressed coded data of the plurality of still images, where the data adding unit includes a unit to set thumbnail information of each of the still images in one or a plurality of formats and a unit to add the thumbnail information with the set format in the header portion when forming the coded data of each of the still images; and an expansion and output unit to expand and output only a thumbnail portion of the compressed coded data, based on the thumbnail information of each of the compressed coded data. According to the image expansion apparatus of one embodiment of the present invention, it is possible to output a dynamic image thumbnail at a high speed, when treating consecutive thumbnails of individual still image data as the dynamic image thumbnail, without increasing the data capacity of the individual compressed image data, with respect to the dynamic image made up of consecutive still images.

Another embodiment of the present invention includes an image output method for extracting a thumbnail of an image, comprising an obtaining step to obtain a series of compressed coded data by generating a single dynamic image file from a plurality of still images, comprising setting a reproducing sequence of the plurality of still images, adding data indicating a storage location of each of the still images according to the set output sequence to a header portion of the file, and generating compressed coded data of the plurality of still images, where adding the data includes setting thumbnail information of each of the still images in one or a plurality of formats and adding the thumbnail information with the set format in the header portion when forming the coded data of each of the still images; and an extracting step to extract a portion of the compressed coded data based on the thumbnail information of each of the compressed coded data. According to the image output method of one embodiment of the present invention, it is possible to output a dynamic image thumbnail at a high speed, when treating consecutive thumbnails of individual still image data as the dynamic image thumbnail, without increasing the data capacity of the individual compressed image data, with respect to the dynamic image made up of consecutive still images.

Still another embodiment of the present invention includes an image output method for outputting a file, comprising an obtaining step to obtain a series of compressed coded data by generating a single dynamic image file from a plurality of still images, comprising setting a reproducing sequence of the plurality of still images and adding data indicating a storage location of each of the still images according to the set output sequence to a header portion of the file; and an output step to output the file according to the reproducing sequence. According to the image output method of one embodiment of the present invention, it is possible to output a dynamic image thumbnail at a high speed, when treating consecutive thumbnails of individual still image data as the dynamic image thumbnail, without increasing the data capacity of the individual compressed image data, with respect to the dynamic image made up of consecutive still images.

Another embodiment of the present invention includes an image output method for outputting a dynamic image thumbnail, comprising an obtaining step to obtain a series of compressed coded data by generating a single dynamic image file from a plurality of still images, comprising setting a reproducing sequence of the plurality of still images and adding data indicating a storage location of each of the still images according to the set output sequence to a header portion of the file, where setting the reproducing sequence sets a still image that is to be used as a thumbnail of a dynamic image from the plurality of still images as dynamic image thumbnail information, and where data adding comprises adding the dynamic image thumbnail information to the header portion of the file; and an output step to output the dynamic image thumbnail based on the dynamic thumbnail information. According to the image output method of one embodiment of the present invention, it is possible to output a dynamic image thumbnail at a high speed, when treating consecutive thumbnails of individual still image data as the dynamic image thumbnail, without increasing the data capacity of the individual compressed image data, with respect to the dynamic image made up of consecutive still images.

Another embodiment of the present invention includes an image output apparatus for extracting a thumbnail of an image, comprising an obtaining unit to obtain a series of compressed coded data by generating a single dynamic image file from a plurality of still images, the obtaining unit comprising an image sequence setting unit to set a reproducing sequence of the plurality of still images, a data adding unit to add data indicating a storage location of each of the still images according to the set output sequence to a header portion of the file, and an image compression unit to generate compressed coded data of the plurality of still images, where the data adding unit sets thumbnail information of each of the still images in one or a plurality of formats and adding the thumbnail information with the set format in the header portion when forming the coded data of each of the still images; and an extracting unit to extract a portion of the compressed coded data based on the thumbnail information of each of the compressed coded data. According to the image output apparatus of one embodiment of the present invention, it is possible to output a dynamic image thumbnail at a high speed, when treating consecutive thumbnails of individual still image data as the dynamic image thumbnail, without increasing the data capacity of the individual compressed image data, with respect to the dynamic image made up of consecutive still images.

Still another embodiment of the present invention includes an image output apparatus for outputting a file, comprising an obtaining unit to obtain a series of compressed coded data by generating a single dynamic image file from a plurality of still images, the obtaining unit comprising an image sequence setting unit to set a reproducing sequence of the plurality of still images, and a data adding unit to add data indicating a storage location of each of the still images according to the set output sequence to a header portion of the file; and an output unit to output the file according to the reproducing sequence. According to the image output apparatus of one embodiment of the present invention, it is possible to output a dynamic image thumbnail at a high speed, when treating consecutive thumbnails of individual still image data as the dynamic image thumbnail, without increasing the data capacity of the individual compressed image data, with respect to the dynamic image made up of consecutive still images.

Another embodiment of the present invention includes an image output apparatus for outputting a dynamic image thumbnail, comprising an obtaining unit to obtain a series of compressed coded data by generating a single dynamic image file from a plurality of still images, the obtaining unit comprising an image sequence setting unit to set a reproducing sequence of the plurality of still images, and a data adding unit to add data indicating a storage location of each of the still images according to the set output sequence to a header portion of the file, where the image sequence setting unit sets a still image that is to be used as a thumbnail of a dynamic image from the plurality of still images as dynamic image thumbnail information, and where the data adding unit adds the dynamic image thumbnail information to the header portion of the file; and an output unit to output the dynamic image thumbnail based on the dynamic thumbnail information. According to the image output apparatus of one embodiment of the present invention, it is possible to output a dynamic image thumbnail at a high speed, when treating consecutive thumbnails of individual still image data as the dynamic image thumbnail, without increasing the data capacity of the individual compressed image data, with respect to the dynamic image made up of consecutive still images.

Another embodiment of the present invention includes a computer-readable storage medium that stores a program for causing a computer to generate a single dynamic image file from a plurality of still images, the program comprising an image sequence setting procedure causing the computer to set a reproducing sequence of the plurality of still images; and a data adding procedure causing the computer to add data indicating a storage location of each of the still images according to the set output sequence, to a header portion of the file. According to the computer-readable storage medium of one embodiment of the present invention, it is possible to output a thumbnail of a dynamic image at a high speed, when treating consecutive still images as the dynamic image.

Still another embodiment of the present invention includes a computer-readable storage medium that stores a program for causing a computer to output a thumbnail of an image, the program comprising an obtaining procedure causing the computer to obtain a series of compressed coded data by generating a single dynamic image file from a plurality of still images, comprising causing the computer to set a reproducing sequence of the plurality of still images, causing the computer to add data indicating a storage location of each of the still images according to the set output sequence to a header portion of the file, and causing the computer to generate compressed coded data of the plurality of still images, where adding data includes causing the computer to set thumbnail information of each of the still images in one or a plurality of formats and causing the computer to add the thumbnail information with the set format in the header portion when forming the coded data of each of the still images; and an expansion and output procedure causing the computer to expand and output only a thumbnail portion of the compressed coded data, based on the thumbnail information of each of the compressed coded data. According to the computer-readable storage medium of one embodiment of the present invention, it is possible to output a dynamic image thumbnail at a high speed, when treating consecutive thumbnails of individual still image data as the dynamic image thumbnail, without increasing the data capacity of the individual compressed image data, with respect to the dynamic image made up of consecutive still images.

Another embodiment of the present invention includes a computer-readable storage medium that stores a program for causing a computer to extract a thumbnail of an image, the program comprising an obtaining procedure causing the computer to obtain a series of compressed coded data by generating a single dynamic image file from a plurality of still images, comprising causing the computer to set a reproducing sequence of the plurality of still images, causing the computer to add data indicating a storage location of each of the still images according to the set output sequence to a header portion of the file, and causing the computer to generate compressed coded data of the plurality of still images, where adding data includes causing the computer to set thumbnail information of each of the still images in one or a plurality of formats and causing the computer to add the thumbnail information with the set format in the header portion when forming the coded data of each of the still images; and an extracting procedure causing the computer to extract a portion of the compressed coded data based on the thumbnail information of each of the compressed coded data. According to the computer-readable storage medium of one embodiment of the present invention, it is possible to output a dynamic image thumbnail at a high speed, when treating consecutive thumbnails of individual still image data as the dynamic image thumbnail, without increasing the data capacity of the individual compressed image data, with respect to the dynamic image made up of consecutive still images.

Another embodiment of the present invention includes a computer-readable storage medium that stores a program for causing a computer to output a file, the program comprising an obtaining procedure causing the computer to obtain a series of compressed coded data by generating a single dynamic image file from a plurality of still images, comprising causing the computer to set a reproducing sequence of the plurality of still images and causing the computer to add data indicating a storage location of each of the still images according to the set output sequence to a header portion of the file; and an output procedure causing the computer to output the file according to the reproducing sequence. According to the computer-readable storage medium of one embodiment of the present invention, it is possible to output a dynamic image thumbnail at a high speed, when treating consecutive thumbnails of individual still image data as the dynamic image thumbnail, without increasing the data capacity of the individual compressed image data, with respect to the dynamic image made up of consecutive still images.

Still another embodiment of the present invention includes a computer-readable storage medium that stores a program for causing a computer to output a dynamic image thumbnail, the program comprising an obtaining procedure causing the computer to obtain a series of compressed coded data by generating a single dynamic image file from a plurality of still images, comprising causing the computer to set a reproducing sequence of the plurality of still images and causing the computer to add data indicating a storage location of each of the still images according to the set output sequence to a header portion of the file, where the image sequence setting causes the computer to set a still image that is to be used as a thumbnail of a dynamic image from the plurality of still images as dynamic image thumbnail information, and where adding data causes the computer to add the dynamic image thumbnail information to the header portion of the file; and an output procedure causing the computer to output the dynamic image thumbnail based on the dynamic thumbnail information. According to the computer-readable storage medium of one embodiment of the present invention, it is possible to output a dynamic image thumbnail at a high speed, when treating consecutive thumbnails of individual still image data as the dynamic image thumbnail, without increasing the data capacity of the individual compressed image data, with respect to the dynamic image made up of consecutive still images.

Other embodiments and further features of one embodiment of the present invention will be apparent from the following detailed description when read in conjunction with the accompanying drawings.

In the following description, it is assumed for the sake of convenience that encoded data (hereinafter also referred to as compressed encoded data) processed by each of the embodiments of the present invention are the encoded data of still image according to JPEG2000 (ISO/IEC FCD 15444-1) and the encoded data of dynamic image according to Motion-JPEG2000 (ISO/IEC FCD 15444-3). The Motion-JPEG2000 treats dynamic image by regarding each of a plurality of consecutive still images as a frame, where the encoded data of each frame are in conformance with the JPEG2000 and only the file format partially differs from that of the JPEG2000.

The JPEG2000 is an image compression and expansion system that succeeds the JPEG and became an international standard in 2001. The algorithm of the JPEG2000 is described in detail in Yasuyuki Nomizu, "Next-Generation Image Coding Method JPEG2000," Ticeps, Feb. 13, 2001. Accordingly, only portions of the JPEG2000 algorithm directly related to the embodiments will be described in the following.

First, a general description will be given of the hierarchical encoding algorithm and the JPEG2000 algorithm that are used in the embodiments that will be described hereunder, in order to facilitate the understanding of one embodiment of the present invention.

FIG. 1 is a functional block diagram showing a system for realizing the hierarchical encoding algorithm that forms a basis of the JPEG2000 that is used in the embodiments. The system shown in FIG. 1 is an image processing apparatus according to one embodiment of the present invention, and employs an image processing method according to one embodiment of the present invention. The system shown in FIG. 1 includes a color space transform and inverse transform unit 1, a two-dimensional wavelet transform and inverse transform unit 2, a quantization and inverse quantization unit 3, an entropy encoding and decoding unit 4, and a tag processing unit 5. This embodiment is characterized by the tag processing unit 5 or the processing with respect to the generated JPEG2000 codes. A unit formed by the two-dimensional wavelet transform and inverse transform unit 2, the quantization and inverse quantization unit 3 and the entropy encoding and decoding unit 4, receives input from and supplies output to the color space transform and inverse transform unit 1, and also supplies output to and receives input from the tag processing unit 5. Each of the units 1 through 5 may of course have different structures in the forward and reverse directions (compression and expansion directions). In addition, each of the units 1 through 5 may perform the processes for every component.

Figure 2:
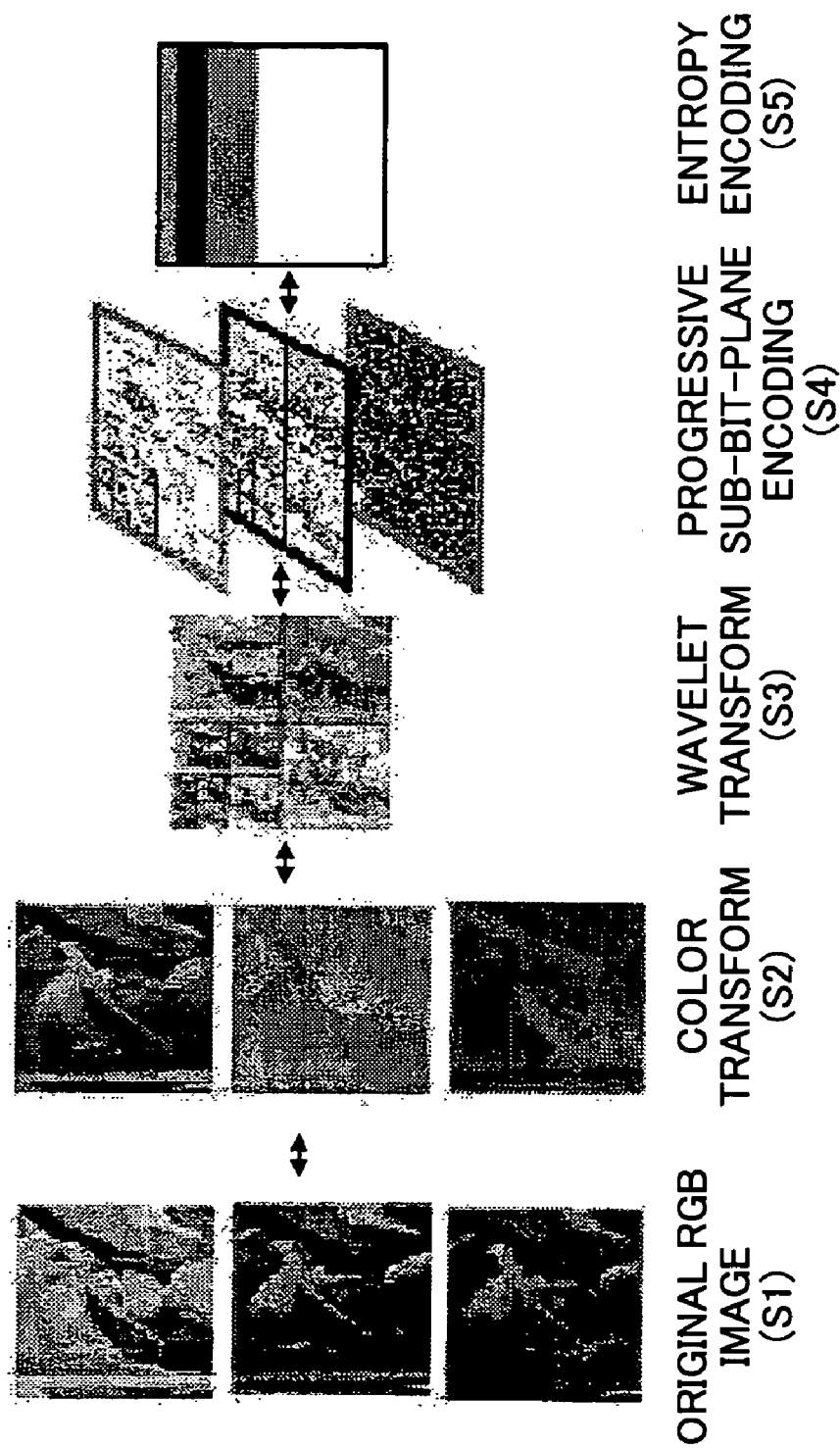
FIG. 2 is a simplified flow chart for illustrating the JPEG2000 algorithm.

FIG. 2 is a simplified flow chart for illustrating the JPEG2000 algorithm. At the time of the compression, a step S1 receives an original RGB image data, and a step S2 carries out a color space transform, by the color space transform and inverse transform unit 1. A step S3 carries out a two-dimensional wavelet transform with respect to each component that is obtained by the color space transform and inverse transform unit 1, by the two-dimensional wavelet transform and inverse transform unit 2, in order to obtain wavelet coefficients. A step S4 carries out a progressive sub-bit-plane encoding with respect to the wavelet coefficients that are obtained by two-dimensional wavelet transform and inverse transform unit 2, by the quantization and inverse quantization unit 3. A step S5 carries out an entropy encoding with respect to the output of the quantization and inverse quantization unit 3, by the entropy encoding and decoding unit 4.

At the time of the expansion, the step S5 carries out an entropy decoding, and the step S4 carries out an inverse quantization. The step S3 carries out a two-dimensional wavelet inverse transform with respect to the wavelet coefficients of each component obtained by the step S4. The step S2 carries out a color space inverse transform, and the step S1 obtains the original RGB image data.

The system shown in FIG. 1 greatly differs from the conventional JPEG algorithm on several points. One differing point of the system shown in FIG. 1, compared to the JPEG algorithm, is the transformation algorithm used. Although the JPEG algorithm uses the Discrete Cosine Transform (DCT), the hierarchical encoding algorithm uses the Discrete Wavelet Transform (DWT) in the two-dimensional wavelet transform and inverse transform unit 102. The DWT has an advantage over the DCT in that the picture quality in the high compression region is improved, and this is one of the reasons the DWT is used the JPEG2000 algorithm that is to succeed the JPEG algorithm.

Another differing point of the system shown in FIG. 1, compared to the JPEG, is the provision of the tag processing unit 5 at the final stage of the system to form the code. In the tag processing unit 5, compressed data is generated as codestream at the time of image compression, and codestream necessary for the expansion is analyzed at the time of the image expansion. The JPEG2000 can realize various convenient functions by use of the codestream. The JPEG2000 algorithm provides many advantageous features, such as high picture quality at a high compression ratio (low bit rate).

One of such advantageous features is that the total code quantity can be adjusted without having to recompress, by a post-quantization that truncates codes of the encoded data. The truncation of the codes may be made in various units, including regions such as tiles and precincts, components, decomposition levels (or resolution levels), bit-planes, sub-bit-planes, packets, and layers in the case of a multi-layer structure.

FIG. 3 is a diagram for illustrating sub-bands at each decomposition level when there are 3 decomposition levels. The compression and expansion process with respect to the still image can be stopped at an arbitrary layer corresponding to the layer of the octave division in the DWT that is block-based as shown in FIG. 3. With regard to the relationship between the decomposition level and the resolution level for each of the sub-bands, the resolution level of 3LL is 0, the resolution level of 3HL, 3LH and 3HH is 1, the resolution level of 2HL, 2LH and 2HH is 2, and the resolution level of 1HL, 1LH and 1HH is 3. In addition, the decomposition level is defined as follows according to JPEG2000 Part1 FDIS (Final Draft International Standard).

Decomposition Level: A collection of wavelet sub-bands where each coefficient has the same spatial impact or span with respect to the source component samples. These include the HL, LH and HH sub-bands of the same two-dimensional sub-band decomposition. For the last decomposition level the LL sub-band is also included.

Another of such advantageous features is that the restructuring of the layers of the encoded data can be carried out in the encoded state. Still another of such advantageous features is that the codes of a certain progression sequence can be restructured into encoded data of another progression sequence in the encoded state. Another of such advantageous features is that the multi-layer encoded data can be divided into two or more codes in units of layers, in the encoded state.

A more detailed description will be given of the JPEG2000 algorithm. The color space transform and inverse transform unit 1 is connected in most cases to the input and output unit with respect to the original image, as shown in FIG. 1. For example, the RGB colorimetric system made up of each of the red (R), green (G) and blue (B) components of the primary color system or, the YMC colorimetric system made up of each of the yellow (Y), magenta (M) and cyan (C) components of the complementary color system, is subjected to the transform or inverse transform to the YUV colorimetric system or the YCbCr colorimetric system.

Figure 4:
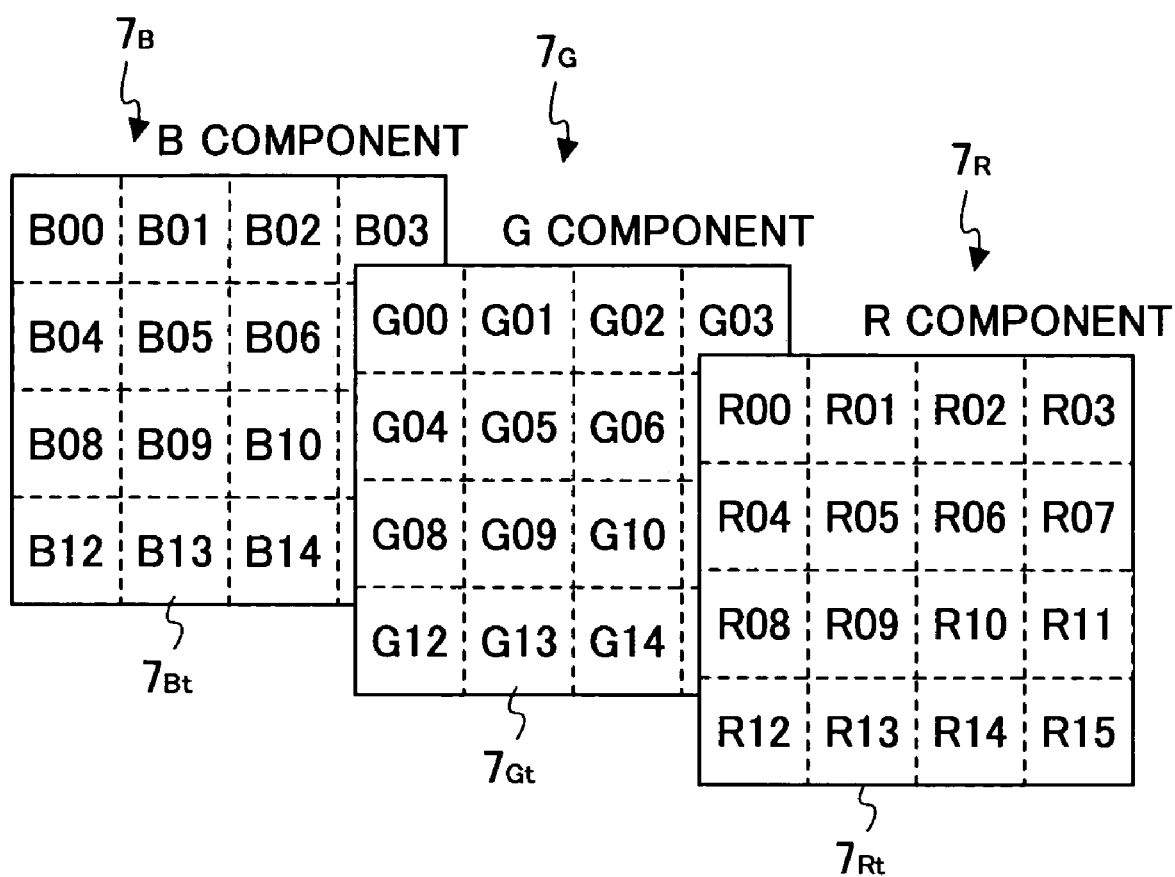
FIG. 4 is a diagram showing divided rectangular regions of each of color components of an original image.

FIG. 4 is a diagram showing divided rectangular regions of each of the color components of the original image. As shown in FIG. 4, each of the R, G and B components $7_R$, $7_G$ and $7_B$ (of the RGB colorimetric system) of the original image is divided into rectangular regions $7_{Rt}$, $7_{Gt}$ and $7_{Bt}$, respectively. Each of the rectangular regions $7_{Rt}$, $7_{Gt}$ and $7_{Bt}$ is generally referred to as a block or a tile. The rectangular regions $7_{Rt}$, $7_{Gt}$ and $7_{Bt}$ are generally referred to as the tiles in the case of the JPEG2000, and thus, the rectangular regions $7_{Rt}$, $7_{Gt}$ and $7_{Bt}$ will hereinafter be referred to as the tiles. Tn the particular case shown in FIG. 4, the component $7_R$ is divided into 4 tiles $7_{Rt}$ in the vertical direction and 4 tiles $7_{Rt}$ in the horizontal direction, that is, a total of 16 (=4×4) tiles $7_{Rt}$. Similarly, the component $7_G$ is divided into 16 tiles $7_{Gt}$, and the component $7_B$ is divided into 16 tiles $7_{Bt}$. More particularly, the R component $7_R$ is made up of tiles R00, R01, . . . , R15, the G component $7_G$ is made up of tiles G00, G01, . . . , G15, and the B component $7_B$ is made up of tiles B00, B01, . . . , B15. The tile forms the basic unit when carrying out the compression and expansion process with respect to the image data. Hence, the image data to be compressed (image data of each frame when treating a dynamic image) is divided into the non-overlapping tiles for each component, and processed in units of tiles for each component. In other words, the compression and expansion of the image data are carried out independently for each component and for each tile. Of course, the tile size may be set identical to the image size, that is, it is possible not to divide the image data into tiles.

When encoding the image data, the data of each tile of each component is input to the color space transform and inverse transform unit 1 shown in FIG. 1. After the data is subjected to the color space transform, a two-dimensional wavelet transform (forward transform) is carried out in the two-dimensional wavelet transform and inverse transform unit 2, in order to spatially divide the data into frequency bands. The color space transform may be omitted.

A description will now be given of the operation of the two-dimensional wavelet transform and inverse transform unit 2 by referring to FIG. 3, for the case where there are 3 decomposition levels. With respect to a tile original image 0LL (decomposition level 0 ($6_0$)) obtained by dividing the original image into the tiles, the two-dimensional wavelet transform is carried out to separate sub-bands 1LL, 1HL, 1LH and 1HH indicated by a decomposition level 1 ($6_1$). Then, with respect to a low-frequency component 1LL in this hierarchical level, the two-dimensional wavelet transform is carried out to separate sub-bands 2LL, 2HL, 2LH and 2HH indicated by a decomposition level 2 ($6_2$). Similarly thereafter, the two-dimensional wavelet transform is carried out with respect to a low-frequency component 2LL to separate sub-bands 3LL, 3HL, 3LH and 3HH indicated by a decomposition level 3 ($6_3$). For example, if there are 3 decomposition levels, the sub-bands 3HL, 3LH, 3HH, 2HL, 2LH, 2HH, 1HL, 1HL and 1HH are to be subjected to the encoding, and the sub-band 3LL is not encoded.

Next, target bits that are to be subjected to the encoding are determined in the order of the specified encoding, and a context is generated from neighboring bits of the target bits in the quantization and inverse quantization unit 3 shown in FIG. 1. In other words, the wavelet coefficients that are obtained by the recursive division (octave division) of the low-frequency components (LL sub-band coefficients) are quantized by the quantization and inverse quantization unit 3 for each sub-band. According to the JPEG2000, both the lossless (reversible) compression and lossy (irreversible) compression are possible. In the case of the lossless compression, the quantization step width is always 1, and the quantization is not carried out at this stage. The wavelet coefficients after the quantization process increases to 12 bits from the 8-bit original image, for example.

Then, the entropy encoding and decoding unit 4 encodes the tiles of each component by probability estimation from the target bits and the context. As a result, the encoding process in units of tiles is carried with respect to all components of the original image. An encoding scheme called the Embedded Block Coding with Optimized Truncation (EBCOT), that includes block division, coefficient modeling and binary arithmetic coding, is used for the entropy encoding with respect to each sub-band coefficient after the quantization. Hence, the bit-plane of each sub-band coefficient after the quantization is encoded for each block called the code block, from the upper bit-plane towards the lower bit-plane.

Finally, the tag processing unit 5 carries out a code forming process. The code forming process of the tag processing unit 5 combines all of the encoded data from the entropy encoding and decoding unit 4 into one codestream, and adds a tag to the codestream. In the tag processing unit 5, packets first are generated by combining the codes of the code blocks generated by the entropy encoding and decoding unit 4. Then, the generated packets are arranged according to the procession sequence and the necessary tag information is added, in order to create the encoded data having a predetermined format. According to the JPEG2000, 5 kinds of progression sequences are defined in relation to the code sequence control depending on the combinations of the resolution level, precinct (position), layer and component (color component).

Next, a more detailed description will be given of the entropy encoding of the entropy encoding and decoding unit 4 and the code forming process of the tag processing unit 5, by referring to specific cases.

The wavelet coefficients after the quantization process ends are divided into non-overlapping rectangles called "precinct" for each of the sub-bands. The precinct is introduced to effectively utilize the memory upon implementation. Furthermore, each precinct is divided into non-overlapping rectangular "code blocks."

A description will now be give of the precinct, the code block, the packet and the layer. The relationship of the sizes of the image, the tile, the sub-band, the precinct and the code block is such that "image"≧"tile"≧"sub-band"≧"precinct"≧"code block."

The precinct is formed by the rectangular regions of the sub-bands, and a group of 3 regions that are spatially located at the same positions of the sub-bands HL, LH and HH of the same decomposition level is treated as one precinct. However, in the case of the LL sub-band, one region is treated as one precinct. The size of the precinct may be made the same as the size of the sub-band. In addition, the rectangular regions obtained by dividing the precinct are the code blocks. A packet is obtained by extracting a portion of the codes of all of the code blocks included in the precinct (for example, the codes of 3 bit-planes from the highest to the third bit-plane). The packet may include a code that is vacant. The encoded data is formed by generating the packets based on a collection of the codes of the code block, and arranging the packets according to a desired progression sequence. As will be described later, a portion starting from SOD related to each tile in FIG. 9 corresponds to the collection of the packets. When the packets of all precincts (that is, all code blocks and all sub-bands) are collected, a portion of the codes of the entire image region (for example, the codes of the bit-planes from the highest to the third bit-plane) is formed, and this portion is the layer. However, as will be described later, it is not essential to include the packets of all of the precincts in the layer. Accordingly, the picture quality of the reproduced image is improved more as the number of layers decoded at the time of the expansion increases. In other words, the layer may be regarded as a unit that indicates the picture quality. When all of the layers are collected, the codes of all of the bit-planes of the entire image region are obtained.

Figure 5:
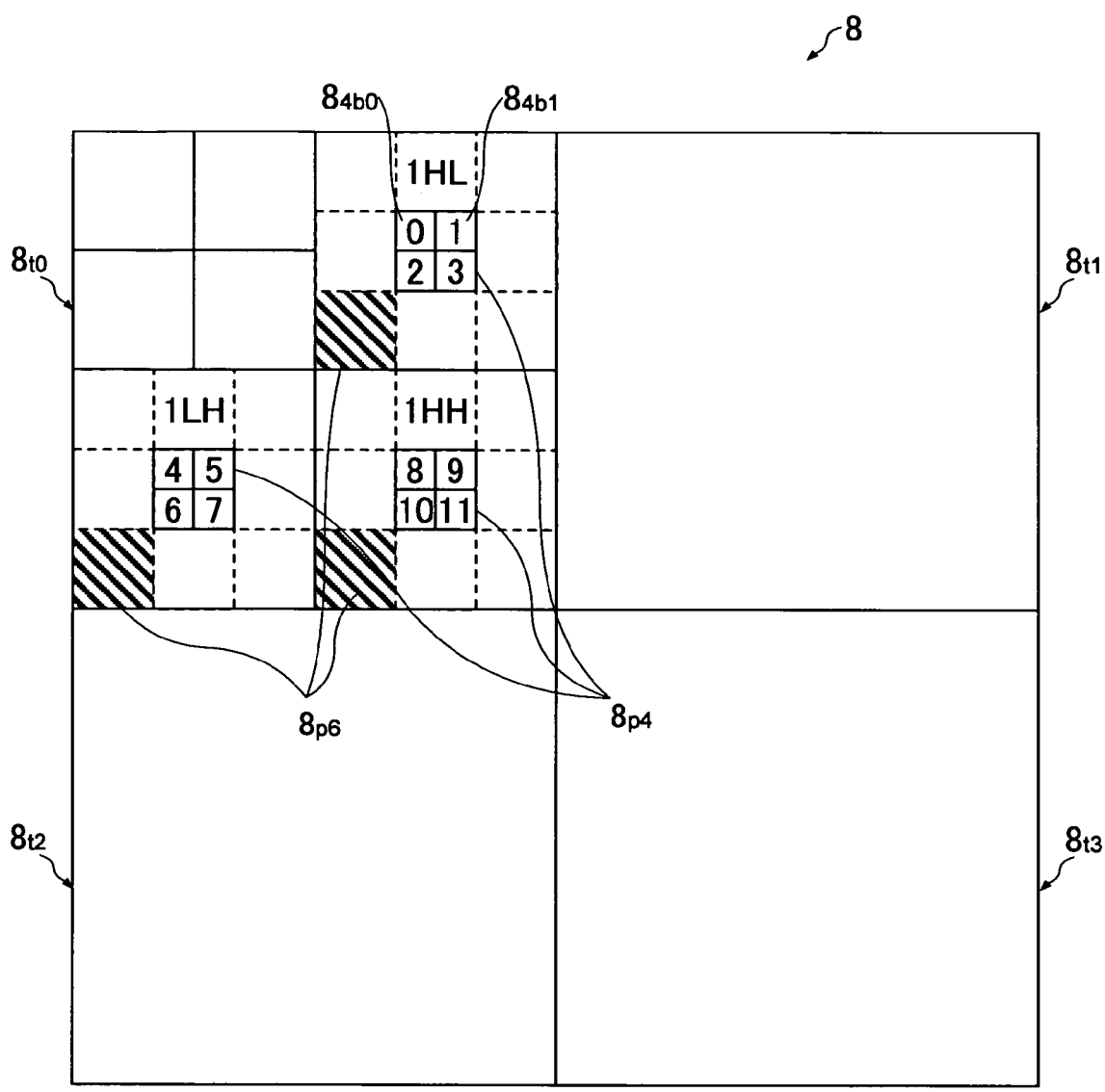
FIG. 5 is a diagram for illustrating the relationship of a precinct and a code block.
Figure 8:
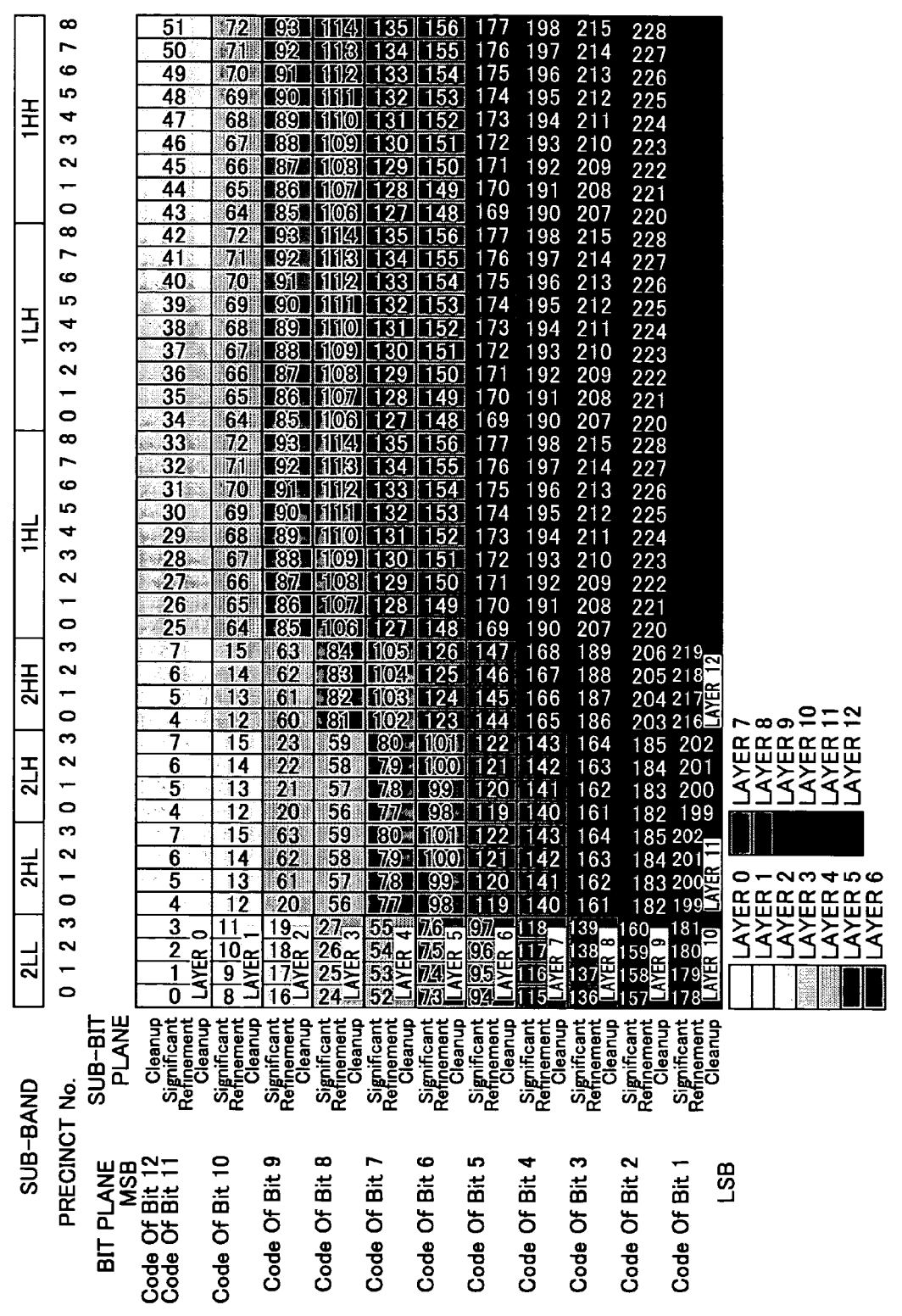

FIG. 5 is a diagram for illustrating the relationship of the precinct and the code block. In addition, FIGS. 6 through 8 are diagrams for illustrating the packets and the layers for a case where the number of decomposition levels is 2 (number of resolution levels is 3). FIG. 6 shows a general layer structure, FIG. 7 shows a layer structure that enables a thumbnail output depending on each of a plurality of equipments, and FIG. 8 shows a layer structure that enables a thumbnail output depending on a transmission line capacity.

The wavelet coefficients after the quantization process ends are divided into the precincts for each of the sub-bands. But as shown in FIG. 5, one precinct, such as a precinct $\mathbf{8}_{p4}$, is formed by 3 rectangular regions that spatially match. Similarly, a precinct $\mathbf{8}_{p6}$ is also formed by 3 rectangular regions that spatially match. In other words, each of the precincts $\mathbf{8}_{p4}$ and $\mathbf{8}_{p6}$ is formed by a group of 3 regions that are spatially located as the same positions. In this case, an original image 8 is divided into 4 tiles $\mathbf{8}_{t0}, \mathbf{8}_{t1}, \mathbf{8}_{t2}$ and $\mathbf{8}_{t3}$ at the decomposition level 1. Further, each of the precincts $\mathbf{8}_{p4}$ and $\mathbf{8}_{p6}$ is divided into non-overlapping rectangular code blocks. For example, the precinct $\mathbf{8}_{p4}$ is divided into code blocks $\mathbf{8}_{4b0}, \mathbf{8}_{4b1}, \ldots$ The code block forms a basic unit of the entropy encoding that is carried out in the entropy coding and decoding unit 4.

As will be described later in conjunction with FIGS. 6 through 8, in order to improve the encoding efficiency, the coefficient values may be decomposed into bi-plane units, and the bi-planes may be ordered for each pixel or code block, in order to form the layer that is formed by one or a plurality of bit-planes. In other words, the layer may be formed from the bit-planes of the coefficient values based on the significance of the bit-planes, and the encoding may be carried out for each layer. Only several layers from a highest layer (MSB), which is a most significant layer, and lower layers, may be encoded, and other layers including a lowest layer (MLB), which is a least significant layer, may be truncated.

FIG. 6 shows the structures of the packets and the layers (number of layers is 10) for the case where the number of decomposition levels is 2 (number of resolution levels is 3). In FIG. 6, each rectangle that is elongated in the vertical direction indicates the packet, and a numeral indicated within the rectangle denotes a packet number. The layers are indicated as rectangular regions that are elongated in the horizontal direction with gradation. In other words, in this particular case, there are 10 layers, namely, a layer 0 made up of the codes of the packets having the packet numbers 0 through 51, a layer 1 made up of the codes of the packets having the packet numbers 52 through 72, a layer 2 made up of the codes of the packets having the packet numbers 73 through 93, a layer 3 made up of the codes of the packets having the packet numbers 94 through 114, a layer 4 made up of the codes of the packets having the packet numbers 115 through 135, a layer 5 made up of the codes of the packets having the packet numbers 136 through 156, a layer 6 made up of the codes of the packets having the packet numbers 157 through 177, a layer 7 made up of the codes of the packets having the packet numbers 178 through 198, a layer 8 made up of the codes of the packets having the packet numbers 199 through 215, and layer 9 made up of the codes of the packets having the remaining packet numbers 216 through 228. The corresponding relationship of the packet and the precinct vary depending on the progression sequence, the number of layers and the like, and the layer structure shown in FIG. 6 is only one example.

Next, a description will be given of the layer structure that enables the thumbnail output depending on each of the plurality of equipments, by referring to FIG. 7. The layer structure shown in FIG. 7 is similar to that shown in FIG. 6, but thumbnail information (packet numbers 2, 10, 18, 26, 54 and 75) that is made up of the codes of the packets having the packet numbers 2, 10, 18, 26, 54 and 75 indicated by the same gradation (tone) is recorded in the header portion for use as the thumbnail output of a digital camera, for example. Similarly, thumbnail information (packet numbers 96 and 117) is recorded in the header portion for use as the thumbnail display of an image viewer software, for example. In addition, thumbnail information (2LL) is recorded in the header portion for use as the thumbnail display of a portable telephone, for example. As will be described later, the thumbnail information is recorded in each still image based on condition information indicative of the picture taking (or photography) conditions under which the picture is taken (picked up).

Next, a description will be given of the layer structure (number of layers is 13) that enables the thumbnail output depending on the transmission line capacity, for the case where the number of decomposition levels is 2 (number of resolution levels is 3), by referring to FIG. 8. In this particular case, there are 13 layers, namely, the layer 0 made up of the codes of the packets having the packet numbers 0 through 3 and indicated by the same gradation (tone), the layer 1 made up of the codes of the packets having the packet numbers 4 through 11 and indicated by the same tone, the layer 2 made up of the codes of the packets having the packets numbers 4 through 7 and 12 through 19 and indicated by the same tone, the layer 3 made up of the codes of the packet numbers having the packet numbers 12 through 15 and 20 through 51 and indicated by the same tone, the layer 4 made up of the codes of the packets having the packet numbers 52 through 72 and indicated by the same tone, the layer 5 made up of the codes of the packets having the packet numbers 73 through 93 and indicated by the same tone, the layer 6 made up of the codes of the packers having the packet numbers 94 through 114 and indicated by the same tone, the layer 7 made up of the codes of the packets having the packet numbers 115 through 135 and indicated by the same tone, the layer 8 made up of the codes of the packets having the packet numbers 136 through 156 and indicated by the same tone, the layer 9 made up of the codes of the packets having the packet numbers 157 through 177 and indicated by the same tone, the layer 10 made up of the codes of the packets having the packet numbers 178 through 198 and indicated by the same tone, the layer 11 made up of the codes of the packets having the packet numbers 199 through 215 and indicated by the same tone, and the layer 12 made up of the codes of the packets having the remaining packet numbers 216 through 228 and indicated by the same tone. The corresponding relationship of the packet and the precinct vary depending on the progression sequence, the number of layers and the like, and the layer structure shown in FIG. 8 is only one example.

In each of the layer structures shown in FIGS. 6 through 8, the encoded data is divided into the packets, and the packets are combined in sequence starting from the packet having the smallest packet number until a predetermined size is reached, so that one layer is formed by the packets amounting to the predetermined size. In addition, the layer structures shown divide 1 bit into 3 sub-bit-planes, namely, the refinement, significant and clean-up. However, a finer control may be made by making smaller divisions in the sub-bit-plane. Moreover, by rearranging the priority order of the packets, it is possible to change the order into an order that places priority on the resolution, an order that places priority on the picture quality, an order that places priority on the position, and the like. The layer structures shown in FIGS. 6 through 8 correspond to the layer structure shown in FIG. 2 for the step S5.

Figure 9:
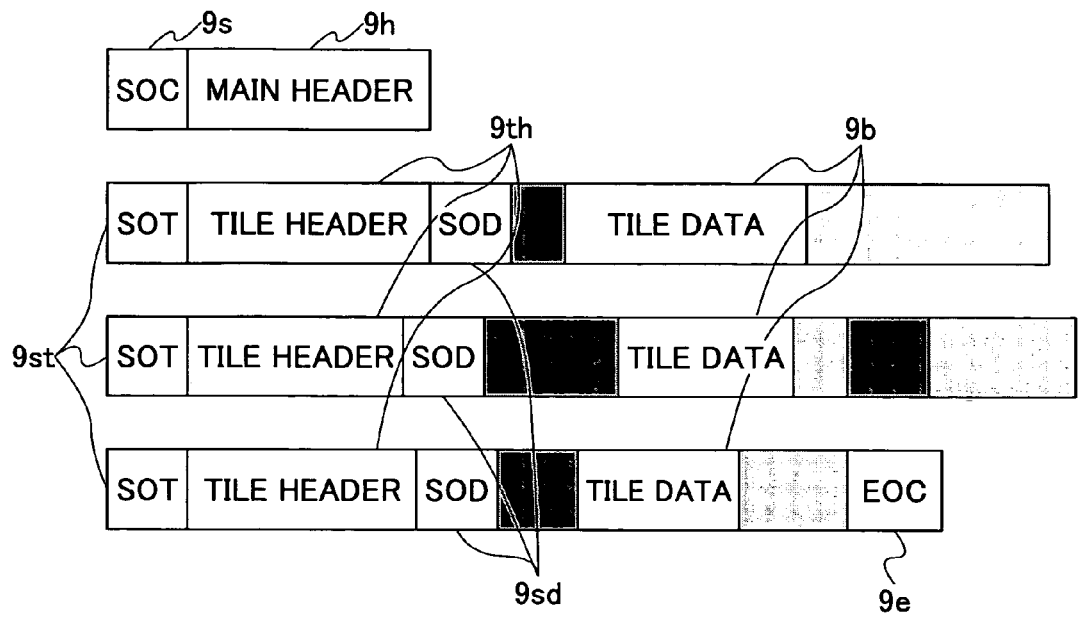
FIG. 9 is a diagram showing a format of encoded data according to JPEG2000 generated by a code forming process.

FIG. 9 is a diagram showing a format of the encoded data according to JPEG2000 (codestream structure) generated by a code forming process. As shown in FIG. 9, the encoded data is added with various tag information. As shown in FIG. 9, the encoded data starts with a SOC marker 9$_s$ which indicates the start of the codestream, and is followed by a main header 9$_h$ that is written with the encoding parameter, the quantization parameter and the like, and the encoded data of each tile. The encoded data of each tile starts with an SOT marker 9$_{st}$, and includes a tile header 9$_{th}$, an SOD marker 9$_{sd}$, and a tile data (encoded data or codestream) 9$_b$. An EOC tag 9$_e$ that indicates the end is provided at the end of the codestream, that is, after the last tile data 9$_b$.

Figure 10:
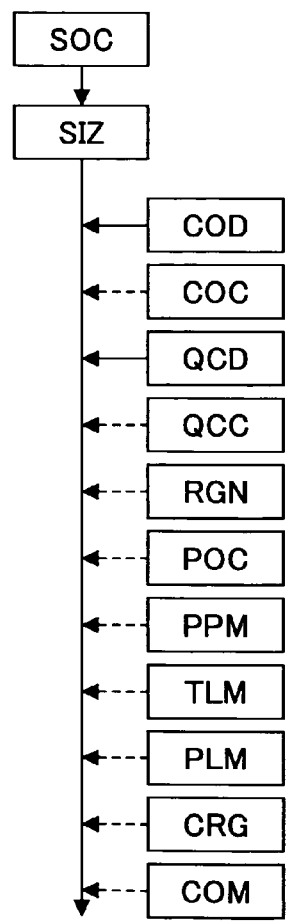
FIG. 10 is a diagram showing a structure of a main header shown in FIG. 9.

FIG. 10 is a diagram showing a structure of the main header 9$_h$ shown in FIG. 9. As shown in FIG. 10, the main header 9$_h$ shown in FIG. 9 is formed by a an image and tile size SIZ, a default code style COD, a code style component COC, a default quantization QCD, a quantization component QCC, a region of interest (ROI) RGN, a default progressive sequence POC, a summarized packet PPM, a tile length TLM, a packet length PLM, a color definition CRG, and comments COM. The default code style COD and the default quantization QCD are essential. In other words, the elements other than the image and tile size SIZ and the default code style COD and the default quantization QCD that are essential, are option.

Figure 11:
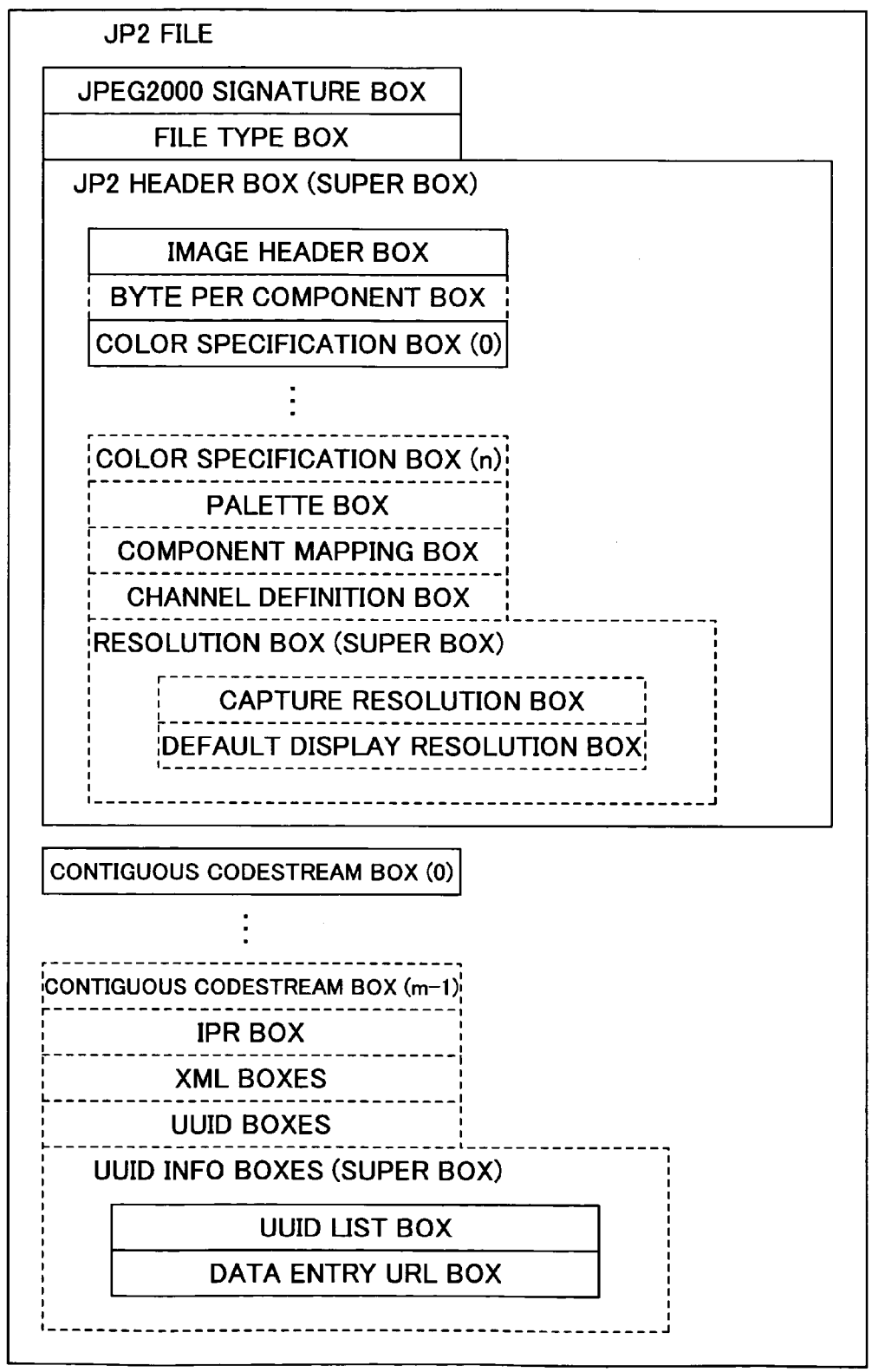
FIG. 11 is a diagram showing a structure of a file format of a basic system of the JPEG2000.

FIG. 11 is a diagram showing a structure of a file format of a basic system of the JPEG2000. The file format of the basic system of the JEPG2000 is called the JP2 file format, and includes the JPEG2000 code format described above in conjunction with FIG. 9. The JP2 file format is designed to include the image data and the meta data, information indicating the characteristics of the image such as the number of gradations and the color space, industrial property information and the like. An information structure of a JP2 file formed by the JP2 file format is made up of boxes that section the information, and includes meta data including information specialized to the application. In FIG. 11, the essential elements are indicated by solid lines, while non-essential or optional elements are indicated by dotted lines. The information structure of the JP2 file shown in FIG. 11 includes a JPEG2000 signature box, a file type box, a JP2 header box, and a contiguous codestream box.

On the other hand, at the time of the decoding, the image data is generated from the codestream of each tile of each component, in a manner in reverse to that at the time of the encoding. In this case, the tag processing unit 5 analyzes the tag information that is added to the external codestream that is input, and decomposes the codestream into the code stream of each tile of each component, so that the decoding process is carried out for each codestream of each tile of each component. The bit position that is the target of the decoding is determined in an order based on the tag information within the codestream. The quantization and inverse quantization unit 3 generates the context from the arrangement of the peripheral bits (already decoded) in the periphery of the target bit position. The entropy encoding and decoding unit 4 carries out the decoding by probability estimation from the context and the codestream, in order to generate the target bit, and writes the target bit to the target bit position.

The decoded data obtained in this manner is spatially divided for each frequency band. Hence, the two-dimensional wavelet transform and inverse transform unit 2 carries out a two-dimensional wavelet inverse transform with respect to the decoded data, in order to restore each tile of each component of the image data. The restored image data is transformed into the image data of the original calorimetric system by the color space transform and inverse transform unit 1.

Figure 12:
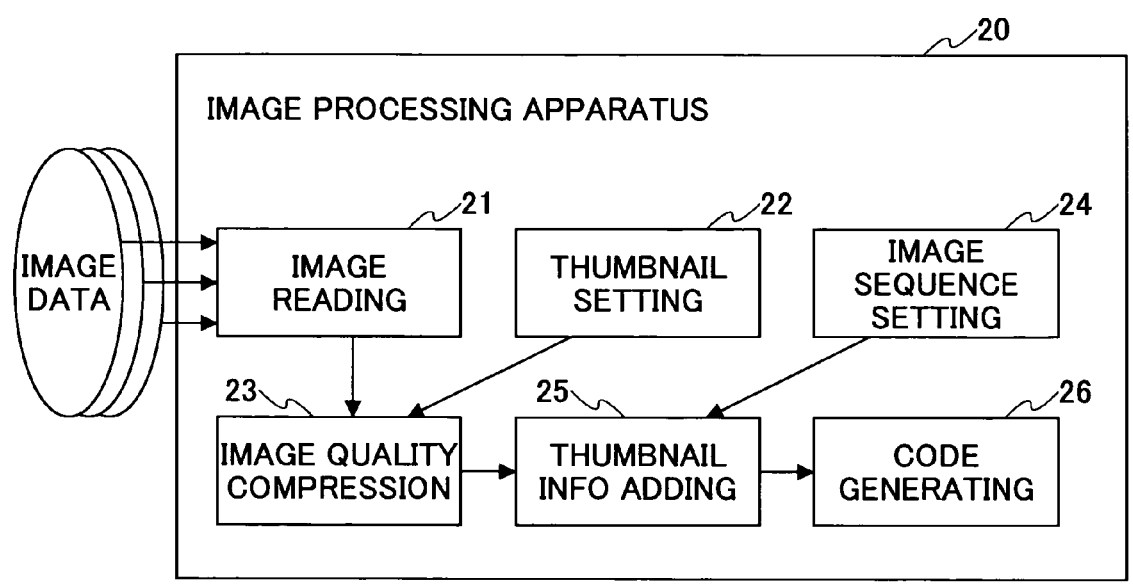
FIG. 12 is a functional block diagram for illustrating one embodiment of an image processing apparatus according to the present invention.
Figure 13:
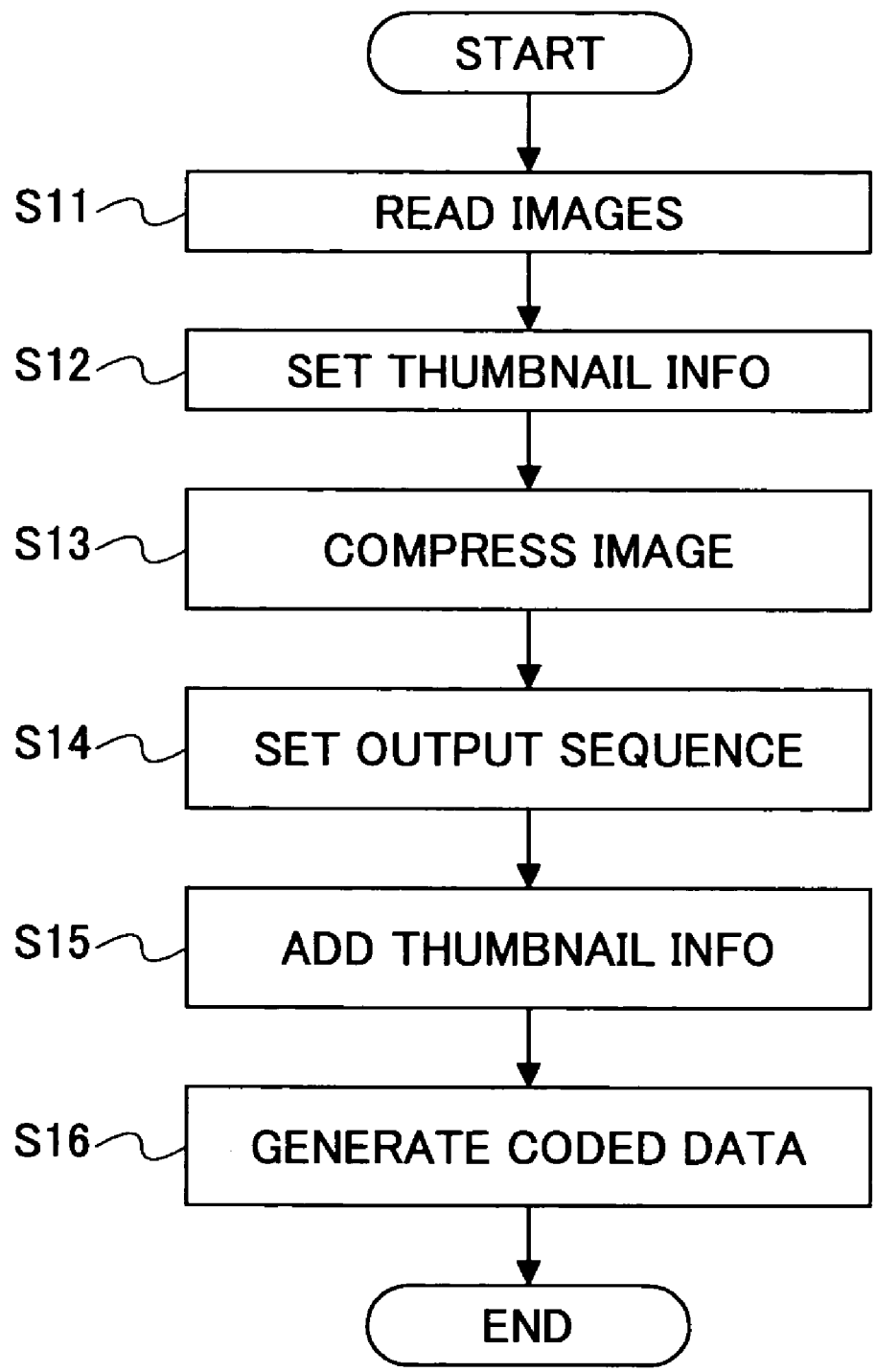
FIG. 13 is a flow chart for illustrating one embodiment of the image processing method according to the present invention, which is carried out by the image processing apparatus shown in FIG. 12.

Next, a description will be given of one embodiment of the image processing apparatus and one embodiment of the image processing method, by referring to FIGS. 12 and 13. FIG. 12 is a functional block diagram for illustrating this embodiment of the image processing apparatus, and FIG. 13 is a flow chart for illustrating one embodiment of the image processing method, that is carried out by the image processing apparatus shown in FIG. 12.

In one embodiment, the image processing apparatus generates an image group file from a plurality of still images, and includes an image sequence setting unit and a data adding unit. The image sequence setting unit sets an output sequence of the plurality of still images. The data adding unit adds, to a header portion of the image group file, data indicating a storage location or the like of each still image according to the set output sequence. In other words, this embodiment groups into one file a plurality of image data that are obtained by taking pictures (or picking up images) independently, and the data indicating the storage location or the like of each image is written in the header portion (file header) of the image group file. Hence, this embodiment also includes a function of converting a plurality of image files that are generated independently into a file format that conforms to the image processing method or, a function of creating a file in conformance with the image processing method.

As a desirable mode of one embodiment, a description will be given of a case where the image processing apparatus is provided with an image compression unit. However, if the image compression unit is not provided, the image group file is generated from the plurality of still images and the output sequence of the still images is written in the header portion, so that as a result, a display in the form of a slide show (display of still images at predetermined intervals in sequence) or a slide display (display of still images having a predetermined sequence based on user operation) is made. In other words, the plurality of still images are grouped into one file using a format similar to that of a dynamic image, so that the reproduction may be made automatically in a slide-show-manner at the time of the thumbnail reproduction or at the time of the reproduction. The information for enabling such a reproduction is written in the header portion, so that it is possible to distinguish the reproducing method from that when reproducing a normal dynamic image file.

In addition to the image compression unit, one embodiment of the image processing apparatus is provided with the data adding unit that includes a thumbnail setting unit and a thumbnail information adding unit. The thumbnail setting unit sets one or a plurality of formats of the thumbnail information of each still image. The thumbnail information adding unit adds the thumbnail information having the set format to the header portion when forming the encoded data of each still image. The thumbnail information that is added is the information shown in FIG. 7, for example. The image processing apparatus may be applied to an image input apparatus such as the digital camera (still or video camera). This embodiment enables a high-speed output (display, printing and transmission) of the thumbnail image in a sequence, even with respect to the plurality of images grouped into a single file, by utilizing the JPEG2000 (ISO/IEC FCD 15444-1) that can store the images in the high-resolution state and enables extraction of an image having a specific resolution and/or an image having a specific picture quality from the coded image data.

In FIG. 12, it is assumed for the sake of convenience that an image processing apparatus 20 includes an image reading unit 21, a thumbnail setting unit 22 that includes the thumbnail setting unit, an image quality compression unit 23, an image sequence setting unit 24 that includes the image sequence setting unit, a thumbnail information adding unit 25 that includes the thumbnail information adding unit, and a code generating unit 26.

The image processing apparatus 20 reads still image data of a plurality of still images by the image reading unit 21 in a step S11 shown in FIG. 13, and sets the thumbnail information by the thumbnail setting unit 22 in a step S112. Of course, the thumbnail information may be set in advance by the thumbnail setting unit 22. In addition, it is possible to read the header portion of a plurality of image data and to select only the image data matching a predetermined picture taking condition or the like. In other words, the image sequence setting unit may set the output sequence with respect to the still images having the same picture taking condition of the plurality of still images, and the plurality of still images may be retrieved from an image group based on a predetermined condition regardless of the picture taking condition.

Next, the image quality compression unit 23 compresses the still image data in a step S13 shown in FIG. 13. The image sequence setting unit 24 sets the output sequence with respect to the plurality of still image data in a step S14, and the thumbnail information adding unit 25 adds the thumbnail information that is set by the thumbnail setting unit 22 to the output sequence that is set by the step S14, in a step S15. The setting of the output sequence of the plurality of still image data in the step S14 may be carried out when reading the plurality of still image data. Alternatively, the output sequence of the plurality of still image data may be set as it is in the header portion.

The code generating unit 26 generates the coded data in a step S16 shown in FIG. 13. In this case, the code generating unit 26 generates the coded data after adding the thumbnail information, however, the thumbnail information may be added during the generation of the coded data. When storing each still image (main image) according to the JPEG2000, it is possible to efficiently develop the thumbnail by setting, in the header portion of the file, the data such as the conditions for extracting the image data as the thumbnail. In other words, by adding, to the header portion of the grouped file, the information for outputting the thumbnail information that is added by the thumbnail information adding unit, it becomes possible to develop the thumbnail according to the output sequence.

The image sequence setting unit sets the display interval of each still image, together with the output sequence that is set as the display sequence, in order to realize the so-called slide-show-like display (reproduction) that displays the still images included within the file by switching the still images for every predetermined time. Alternatively, the switching of the still images to be displayed may be instructed by a bottom or the like that is operated by the user. Compared to the first method, the latter method requires the user operation, but on the other hand, the manual operation enables a high-speed skipping of the still images that do not need to be confirmed or have a small likelihood of having to confirm. Of course, the image output unit of the image processing apparatus 20 may be designed so that the user may freely select one of these two methods of switching the still images.

The thumbnail information (and image sequence information) may be recorded in the comments COM shown in FIG. 10, the file format XML boxes shown in FIG. 11, the file format UUID boxes shown in FIG. 11, and the like, but the recording location is not limited to such. The thumbnail information may be written as follows in the file format XML boxes.

```
<?xml version="1.0" encoding="Shift-JIS"?>
<!DOCTYPE html
    PUBLIC "-//W3C//DTD XHTML 1.0 Strict//EN"
    "http://www.w3.org/TR/xhtml1/DTD/xtml1-strict.dtd">
<html xmlns="http://www.w3.org/1999/xhtml" xml:lang="ja" lang="ja">
  <head>
  <title> thumbnail </title>
  </head>
  <body>
   <p>3LL</p>
  </body>
</html>
```

Figure 14A:
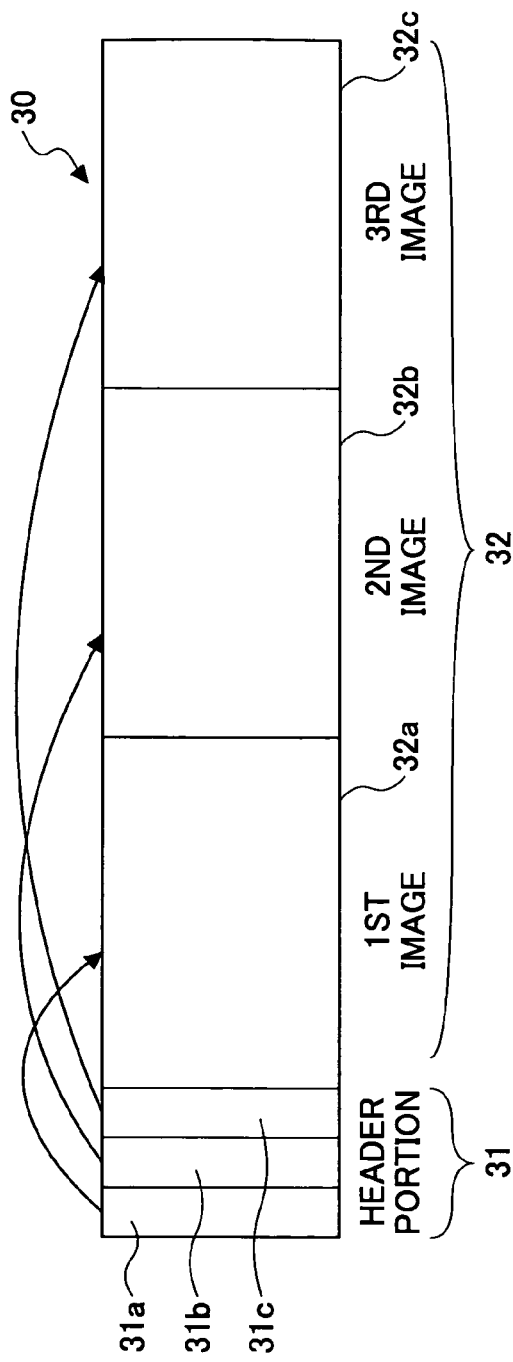
FIGS. 14A and 14B are diagrams for illustrating data of a file generated by one embodiment of the image processing apparatus in comparison with data of a file generated by a conventional method such as that standardized by the Exif.
Figure 14B:
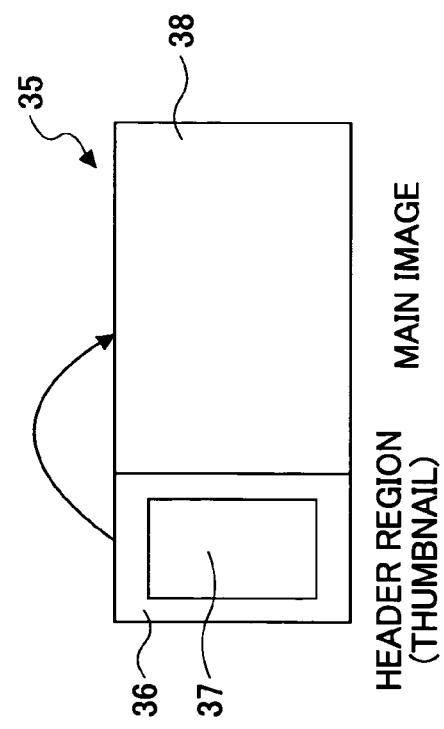

FIGS. 14A and 14B are diagrams for illustrating the data of the file generated by one embodiment of the image processing apparatus in comparison with the data of the file generated by the conventional method such as that standardized by the Exchangeable image file format (Exif) or the like. FIG. 14A shows the file generated from the plurality of still images by one embodiment, and FIG. 14B shows one image generated by the conventional method that is standardized by Exif or the like. In FIGS. 14A and 14B, data that functions as a pointer to each of the plurality of still images is written in the header portion of the image data, so that the plurality of still images can be reproduced using the data.

First, as may be seen from the compressed encoded data 35 shown in FIG. 14B, the small image 37 for the thumbnail must be embedded within the header region 36, separately from the data of the main image 38. Hence, although a high-speed thumbnail output is possible, it takes time to acquire the data because the data capacity becomes large. Moreover, in the case of the Exif, no method has been provided to include a plurality of still images.

On the other hand, a file 30 that is generated by one embodiment of the image processing apparatus includes a header portion 31 and a data portion 32, as shown in FIG. 14A. The data portion 32 includes a group of data 32a of a first still image, data 32b of a second still image, and data 32c of a third still image. It is assumed for the sake of convenience that each of the data 32a, 32b and 32c is added with a corresponding header (including thumbnail information of each image) at the head thereof. Information 31a, 31b and 31c indicating the sequence of the first, second and third still images is recorded in the header portion 31. Accordingly, the information 31a, 31b and 31c that function as pointers to the corresponding still images are written in the header portion 31 of the image data (file 30), so that the plurality of still images can be reproduced based on the information 31a, 31b and 31c. When displaying the thumbnail, a reference is first made to the header portion 31, in order to obtain the information related to the storage location of the first still image and the thumbnail display (for example, a number of tiles to be used for the thumbnail display).

By forming one file in the above described manner, the still image data may be grouped according to a common attribute such as the date and place the pictures were taken, and the still image data of a plurality of still images can be managed with ease. In addition, when making the thumbnail display of the grouped still images, the still images within the file may be displayed in a sequence in the slide-show-like manner responsive to the selection of the file, in order to facilitate the confirmation of the plurality of still images included in the file. Furthermore, since the thumbnail information is written in the JPEG header portion of the main image, it is unnecessary to prepare a thumbnail image separately, and the thumbnail display can be made by merely accessing the necessary portion of the file.

In one embodiment, the JPEG2000 is used as the compression system (or technique) for the main image, and it is possible to create the thumbnail directly from the main image. For this reason, it is unnecessary to embed the thumbnail in the header portion as was required according to the conventional method. Accordingly, the size of the header portion can be made small compared to that used by the conventional method, and the time required to read the header portion is relatively short even when the header portion is arranged with respect to a plurality of still images. It should be noted that the method proposed in the Japanese Laid-Open Patent Application No.2002-058025 is different from this embodiment that writes the frame information in the header portion of the file that is the same as the codestream file.

In one embodiment, a large number of pictures taken are grouped using a common attribute such as the date and place the pictures were taken, in order to facilitate retrieval and handling of the pictures, that is, still images. Hence, a description will now be given of how the attribute is written. The compressed coded data of the image obtained in one embodiment (a plurality of image data that are input even in a case where this embodiment is not provided with an image compression unit) are generated based on the system prescribed by the JPEG2000, and one or more of the following information standardized by the Exif standard may be written in the header portion. In other words, one or more information selected from the following group may be written in the header portion, where the group includes an exposure time at the time when the picture is taken, an F-number, an exposure program, a spectrum sensitivity an ISO speed rate, a photo-electric conversion function, a shutter speed, a stopper value, a luminance value, an exposure correction value, a lens minimum F value, an object distance, a light measuring system, a light source, a flash, a lens focal distance, a flash intensity, a spatial frequency response, a resolution of width on a focal plane, a resolution of height on the focal plane, a resolution unit on the focal plane, an object position, an exposure index, a sensor system, and information related to camera position using GPS. The information related to the camera position using the GPS includes latitude and longitude, altitude, unit of altitude, GPS time, generation signal used for the measurement, state of GPS receiver, measuring method of GPS, reliability of measurement, unit of velocity, velocity, unit in moving direction, moving direction, unit of direction of picture taken, direction of picture taken, map data using the measurements, latitude and longitude of target position, unit of bearing of the target position, bearing of target position, unit of distance to target position, and distance to target position.

Figure 15:
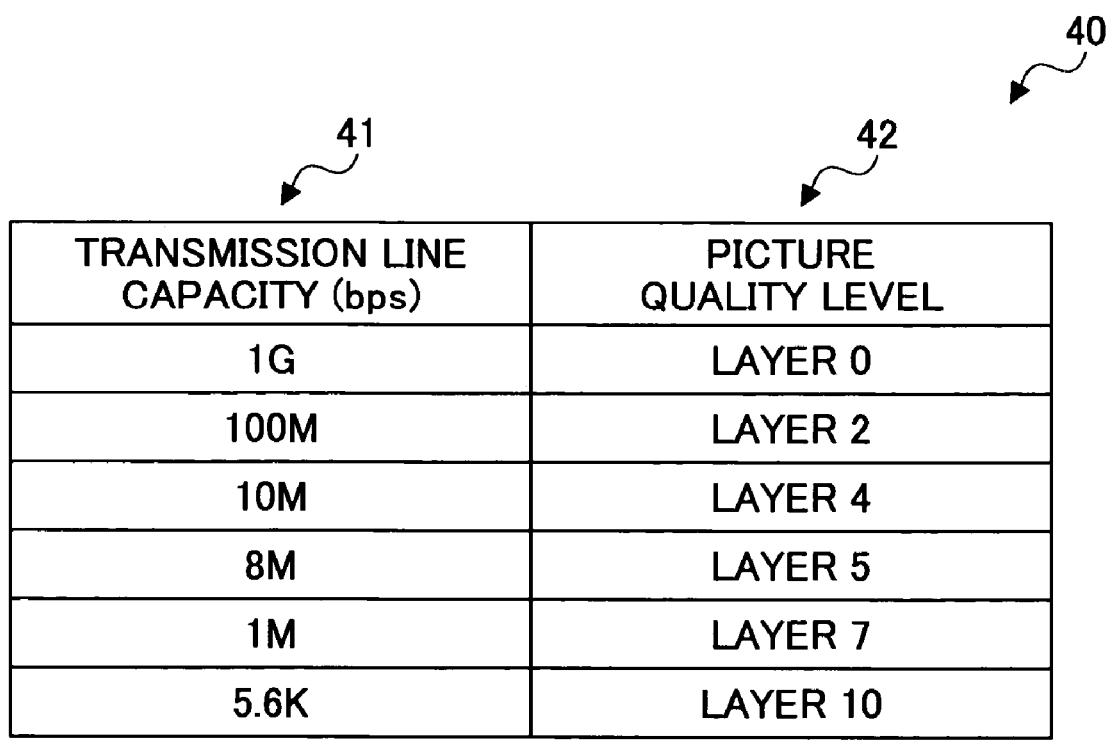
FIG. 15 is a diagram showing thumbnail information set in the image processing apparatus shown in FIG. 12.

FIG. 15 is a diagram showing the thumbnail information set in the image processing apparatus 20 shown in FIG. 12. In the image processing apparatus 20, any one of resolution information of the image, position information of the image, component information of the image, picture quality information of the image, and sub-band information of the image may be used as the thumbnail information. In addition, a combination of two or more of such information may be used as the thumbnail information.

The decomposition level information may be used as the resolution information. For example, one or a plurality of information selected from tile information, precinct information, code block information and pixel position information may be used as the position information. In addition, layer information and/or bit-plane information may be used as the picture quality information.

The image processing apparatus 20 stores the corresponding relationship, and FIG. 15 shows a correspondence table 40 that is stored as the corresponding relationship when the picture quality information (picture quality level) is used as the thumbnail information and the picture quality level is indicated by the layer. The correspondence table 40 stores the corresponding relationship of a transmission line capacity (bps) 41 and a picture quality level 42. A layer 10 (most important layer) is stored with respect to a transmission line capacity (bps) of 5.6 K, a layer 7 (for example, layers 7 through 0 are truncated, and similar truncation is made for the other layers) is stored with respect to a transmission line capacity (bps) of 1 M, a layer 5 is stored with respect to a transmission line capacity (bps) of 8 M, a layer 4 is stored with respect to a transmission line capacity (bps) of 10 M, a layer 2 is stored with respect to a transmission line capacity (bps) of 100 M, and a layer 0 is stored with respect to a transmission line capacity (bps) of 1 G. In this case, a target value may be set with respect to a tolerable processing time, and the picture quality level may be set with respect to each velocity. The layers shown in FIG. 15 for the picture quality level 42 are based on the layer structures shown in FIGS. 6 through 8, for example, but the layer representation may be set arbitrarily.

Figure 16:
FIG. 16 is a diagram showing an original image.

FIG. 16 is a diagram showing an original image, and FIGS. 17A through 17D are diagrams for illustrating images obtained by processing the original image shown in FIG. 16.

More particularly, FIGS. 17A through 17D are diagrams showing the images that are obtained by compressing the original image by the image processing apparatus and outputting from an image output apparatus or an image expansion apparatus.

The compressed coded data generated by the image processing apparatus 20 shown in FIG. 12 may be obtained by one embodiment of the image output apparatus according to one embodiment of the present invention that obtains the thumbnail of the image. This embodiment of the image output apparatus desirably includes an extracting unit that extracts a portion of the coded data from the compressed coded data, based on the thumbnail information that is recorded in the header portion. The extracting unit may not only expand and output the thumbnail based on the thumbnail information, but also expand and output a reduced image or an enlarged image other than the original image or the thumbnail, by making the header portion having an analyzable structure. When outputting the compressed coded data having the thumbnail information recorded in a plurality of formats, measures may be taken so that the format is selectable by the user.

Figure 17A:
FIGS. 17A through 17D are diagrams for illustrating images obtained by processing the original image shown in FIG. 16.
Figure 17B:
Figure 17C:
Figure 17D:
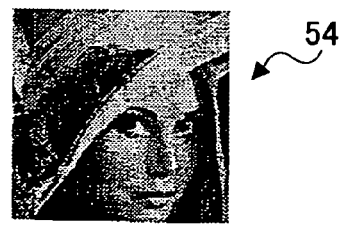

When only a predetermined color component is specified (for example, specified for people who cannot distinguish colors) as the thumbnail with respect to an original image 50 shown in FIG. 16, an image 51 shown in FIG. 17A is output. Similarly, when one component is specified as the thumbnail, an image 52 shown in FIG. 17B is output. An image 53 shown in FIG. 17C is output when only the layer 0 is specified as the thumbnail. Further, an image 54 shown in FIG. 17D is output when a central tile is specified as the thumbnail.

Furthermore, the compressed coded data generated by the image processing apparatus 20 shown in FIG. 12 may be output as the thumbnail by one embodiment of the image expansion apparatus according to the present invention that outputs the thumbnail of the image. This embodiment of the image expansion apparatus is desirably provided with an expansion and output unit that expands and outputs only the thumbnail portion of the compressed coded data, based on the thumbnail information that is recorded in the header portion. This expansion and output unit may be constructed in order to be able to analyze the header portion. When outputting the compressed coded data having the thumbnail information recorded in a plurality of formats, measures may be taken so that the format is selectable by the user.

In a case other than the embodiment shown in FIG. 12, where the apparatus according to the present invention is not provided with the image compression unit, the single file that groups the plurality of image data that are input may be output from the image output apparatus according to an output sequence thereof.

One embodiment of an image conversion apparatus according to the present invention carries out an inverse conversion to convert the file generated by the image processing apparatus described above into a plurality of still images. An inverse conversion unit of the image conversion apparatus converts the file that groups the plurality of still images into the plurality of still images, so that each still image forms one independent file. The procedures carried out by the inverse conversion are in reverse to the procedures carried out by the conversion, and a description thereof will be omitted.

Therefore, according to the embodiment of the image processing apparatus, it is possible to easily manage the plurality of still images by grouping the plurality of still images into a single file. In addition, a single file can be generated by grouping a plurality of compressed image data that enable high-speed output of the thumbnail of the image data, without increasing the data capacity of the compressed image data.

Moreover, by recording the thumbnail information having a plurality of formats in the header portion (header information), it is possible to generate the compressed coded data that enables the thumbnail output in a plurality of formats, and a single file grouping a plurality of still images can be output according to a set output sequence. Furthermore, with respect to the single file grouping the plurality of images, it is possible to output the thumbnail of each image data in a sequence at a high speed, without increasing the data capacity of each compressed image data. In addition, it is possible to generate (by inverse conversion) each still image as an individual file, from the single file that groups a plurality of still images. Such apparatuses according to one embodiment of the present invention may be applied to an image distribution system or the like that distributes images via one or more networks.

As a method of displaying the image file that stores a plurality of still images, it is desirable to first make a reference to the header portion, in order to obtain the storage location of the still image and the information related to the thumbnail display (for example, the number of tiles to be used for the thumbnail). This method may be applied as long as the thumbnail information is recorded in the original still image, even when the file is generated by an image processing apparatus having no image compression unit.

The thumbnail of the still images grouped into the file may be displayed according to the following two methods depending on the needs at the time of the display, for example. According to a first method, the plurality of still images included within the file are switched for every predetermined time and displayed in a sequence, to provide the so-called slide-show-like display. This first method does not require a special operation to switch the display of the plurality of still images, and is advantageous in that the user does not need to perform a complicated operation. However, since the plurality of still images is switched automatically, this first method may not be suited for a case where the user requires time to confirm the still images. On the other hand, a second method switches the plurality of still images to be displayed in response to an operation of the user, such as the operation of a button. Compared to the first method, the second method requires the user operation, but the user can manually skip the still image that does not need to be confirmed at a high speed. Of course, the first and second methods may be made selectable by the user. For example, the first method may be used for the initial display when the display of a file is instructed, and the display method may be switched to the second method when the user carries out a certain operation. The display method may further be switched back to the first method when the user carries out another operation.

The embodiments of the image processing apparatus, the image output apparatus (including the image display apparatus) and the image expansion apparatus according to the present invention, employ embodiments of the image processing method, the image output method (including the image display method) and the image expansion method according to the present invention. The methods according to one embodiment of the present invention may be computer-implemented, and the apparatuses according to one embodiment of the present invention may be realized by a computer that functions as the apparatus or functions as each unit of the apparatus.

One embodiment of a computer-readable storage medium according to the present invention stores a computer program for causing the computer to perform any of the methods according to one embodiment of the present invention, that is, for causing the computer to function as any of the apparatuses according to one embodiment of the present invention.

Hence, by executing the program stored in the computer-readable storage medium, the computer can form a system that functions similarly to any of the apparatuses according to one embodiment of the present invention to obtain effects similar to those obtainable by the apparatuses according to one embodiment of the present invention.

The program that causes the computer to perform the image processing, image output (including image display) and/or image expansion, may be stored in any kind of recording media capable of storing the program in a computer-readable manner. The recording medium forming the computer-readable storage medium may be selected from optical recording media such as CD-ROM and DVD-ROM, magneto-optical recording media such as magneto-optical disks, magnetic recording media such as floppy disk (FD), and semiconductor memory devices such as flash memories, ROMs and RAMs. The recording medium may or may not be portable. The program stored in the computer-readable storage medium may be executed by an information processing apparatus including a general-purpose computer such as a personal computer that includes a processor such as a CPU and a storage unit. The program stored in the computer-readable storage medium may be read and executed by the information processing apparatus into which the computer-readable storage medium is loaded. Alternatively, the program may be stored in the computer-readable storage medium that is provided within the information processing apparatus, and the program may be read and executed when necessary.

Figure 18:
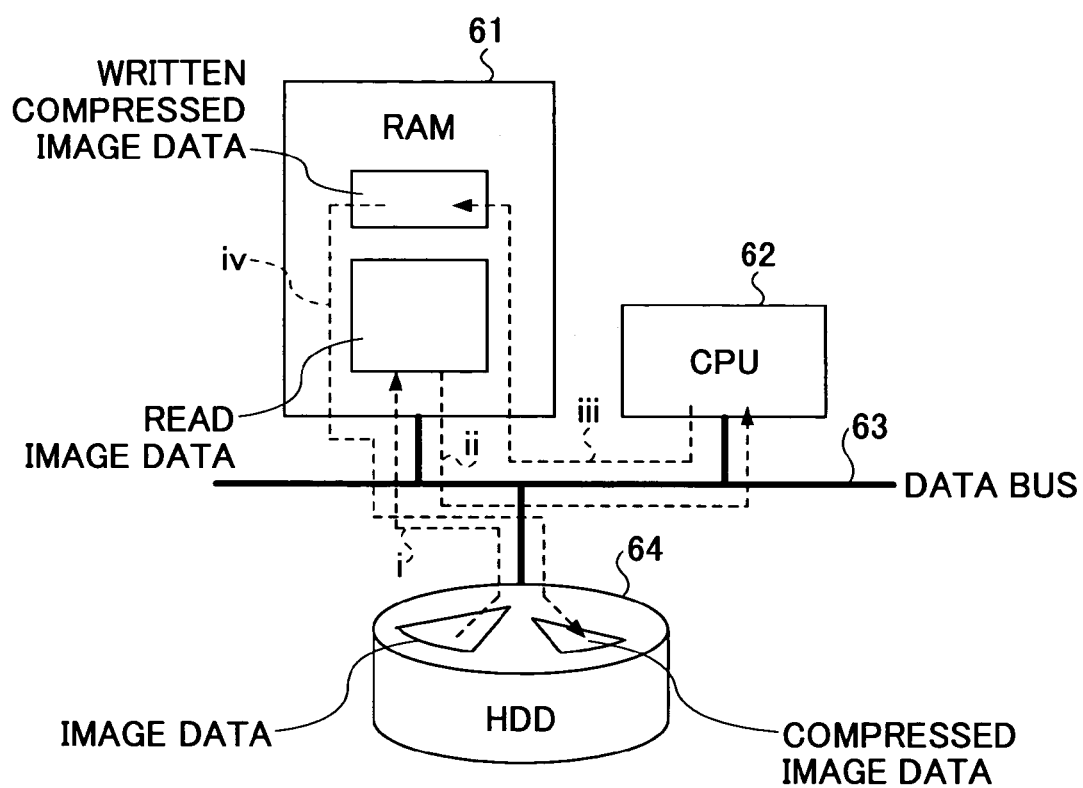
FIG. 18 is a diagram showing a structure of the image processing apparatus.

Next, a description will be given of an apparatus to which one embodiment described above may applied, by referring to FIG. 18. FIG. 18 is a diagram showing a structure of the image processing apparatus. The image processing apparatus shown in FIG. 18 includes a RAM 61, a CPU 62 and a hard disk drive (HDD) 64 that are connected via a data bus 63. The image processing apparatus generates, from the image data of a plurality of original images, compressed image data as a single file that is stored in the HDD 64.

A plurality of image data (or compressed image data) of the original images stored in the HDD 64 are read into the RAM 61 in response to an instruction from the CPU 62, as indicated by i in FIG. 18. Next, the CPU 62 reads the plurality of image data in the RAM 61, obtains wavelet coefficients, and generates the compressed image data as a single file by applying the image sequence adding process and the thumbnail information adding process of one embodiment of the present invention, as indicated by ii in FIG. 18. The CPU 62 writes the compressed image data, generated, into another region of the RAM 61 as indicated by iii in FIG. 18. The compressed image data is stored in the HDD 64 in response to an instruction from the CPU 62, as indicated by iv in FIG. 18. In the image processing apparatus or the image expansion apparatus, the individual images are output according to the sequence written in the header portion of the file, when outputting the compressed image data (file) for display, printing or transmission. When making the thumbnail output, the sequence of the images is obtained from the header portion of the file, and the thumbnail can be output in a sequence based on each thumbnail information. The image processing apparatus shown in FIG. 18 may be used in common as the image output apparatus or the image expansion apparatus. On the other hand, the image output apparatus or the image expansion apparatus may have a structure similar to that of the image processing apparatus shown in FIG. 18.

Next, a description will be given of further problems to be solved by other embodiments of the present invention.

Recently, high-definition images have become popular due to improvements in digital still cameras, digital video cameras, input devices such as scanners, and output devices such as ink-jet printers and displays. Presently, the JPEG is popularly used as the image compression and expansion algorithm for treating such high-definition images. The JPEG employs the two-dimensional DCT transform in order to eliminate redundancy in the spatial region.

But the basic function of the JPEG is to compress and expand the still image. For this reason, it is impossible to operate on the image in a state of the compressed file, and it is impossible to view only a specific region of the image at the time of the expansion. In addition, the image is treated as a flat structure having no layer structure. Accordingly, in order to perform a new process with respect to the image, it is always necessary to completely decode the coded image data.

According to the JPEG algorithm, as the scale and high-definition of the image increase, that is, as the number of pixels of the original image increases, the time required to expand the coded image data and to display the image values on the display device as the image also increases therewith. Recently, the scale, area and high-definition of the original image have increased considerably due to high performances achieved by the input devices, and the increase in the time required to expand and display the image is becoming no longer negligible. The increase in the time required to expand and display the image is already recognized as an inconvenience to be solved when treating satellite and aerial photographs, medial and scientific images, images that record cultural properties and the like. When expanding the compressed image that has been compressed according to the JPEG, the time required for the expansion is constant regardless of the reduction ratio, because as described above, the data encoded according to the JPEG is always completely decoded regardless of the reduction ratio.

Normally, it is difficult to display all pixels of such a large image on the display, due to the limit number of displayable pixels on the display device. Hence, the image is actually reduced and displayed on the screen. However, according to the conventional JPEG algorithm, the entire original image is expanded to obtain all of the pixel values, even when displaying the reduced image, and a decimation process is carried out with respect to all of the pixel values in order to display the reduced image on the display. The time required to obtain all of the pixel values of the original image increases proportionally to the number of pixels of the original image. Hence, although it depends on the performance of the CPU, MPU or the like and the storage capacity of the memory, it takes approximately several minutes to several tens of minutes until the image is displayed, for example.

In some cases, the user may be able to obtain sufficient information without having to perform the complete decoding process. However, according to the conventional JPEG algorithm, it is necessary to perform the complete decoding process, and it is impossible to specify an image region or a color component to be expanded or to specify a sequence of the expansion process at the time of the expansion. According to the conventional JPEG, it is difficult to cope with demands such as to display a color image as a gray-scale image, to display only a specific region of the image, to display the image with the size of a thumbnail, to inspect image contents at a high speed, and to view a fast-forward display of a motion still image. The conventional JPEG algorithm first carries out the complete expansion process with respect to the compressed coded data of the original image, in order to generate the image data, and then converts the image data in order to obtain a desired display image. The image data may be converted into image data for gray-scale display, image data for specific region display, image data for thumbnail display, and the like.

On the other hand, the thumbnail of the image is often displayed on the image display apparatus. According to the thumbnail display made by a conventional method, the entire image is expanded, the resolution is reduced to the necessary level, and the expanded image is displayed. Another conventional method makes the thumbnail display by separately storing the thumbnail image. In either case, the image compression and expansion are carried out using the basic functions or, the extended functions if necessary, based on the JPEG standard.

However, it takes considerable time until the thumbnail image is output, not only when displaying the thumbnail image, but also when printing and transmitting the thumbnail image, if the thumbnail image is output using the method that expands the entire image and then reduces the resolution to the necessary level.

In addition, according to the method that separately stores the thumbnail image and reads the stored thumbnail image when outputting the thumbnail image, it is generally necessary to store the data of the thumbnail image (small image) in the header portion of the compressed data of the main image, as standardized by the Exif, for example. As a result, the thumbnail image can be output at a high speed, but the data capacity of the compressed data becomes large.

These problems become more notable when treating consecutive still images as a dynamic image. Hence, the embodiments described hereunder are designed to solve these problems.

In other words, another embodiment of the present invention includes an image processing method, an image processing apparatus and a computer-readable storage medium, that can output a thumbnail of a dynamic image at a high speed, when treating consecutive still images as the dynamic image.

Still another embodiment of the present invention includes an image output method, an image expansion method, an image output apparatus, an image expansion apparatus and a computer-readable storage medium, that can output a dynamic image thumbnail at a high speed, when treating consecutive thumbnails of individual still image data as the dynamic image thumbnail, without increasing the data capacity of the individual compressed image data, with respect to the dynamic image made up of consecutive still images.

In another embodiment of the present invention, the thumbnail image and the dynamic image thumbnail are output (displayed, printed or transmitted) at a high speed, by utilizing the JPEG2000 (ISO/IEC FCD 15444-1) that is proposed as the next-generation image encoding system to the JPEG and stores the image in the high-definition state in order to enable extraction of an image having a specific resolution or a specific picture quality from the encoded image data.

Figure 19:
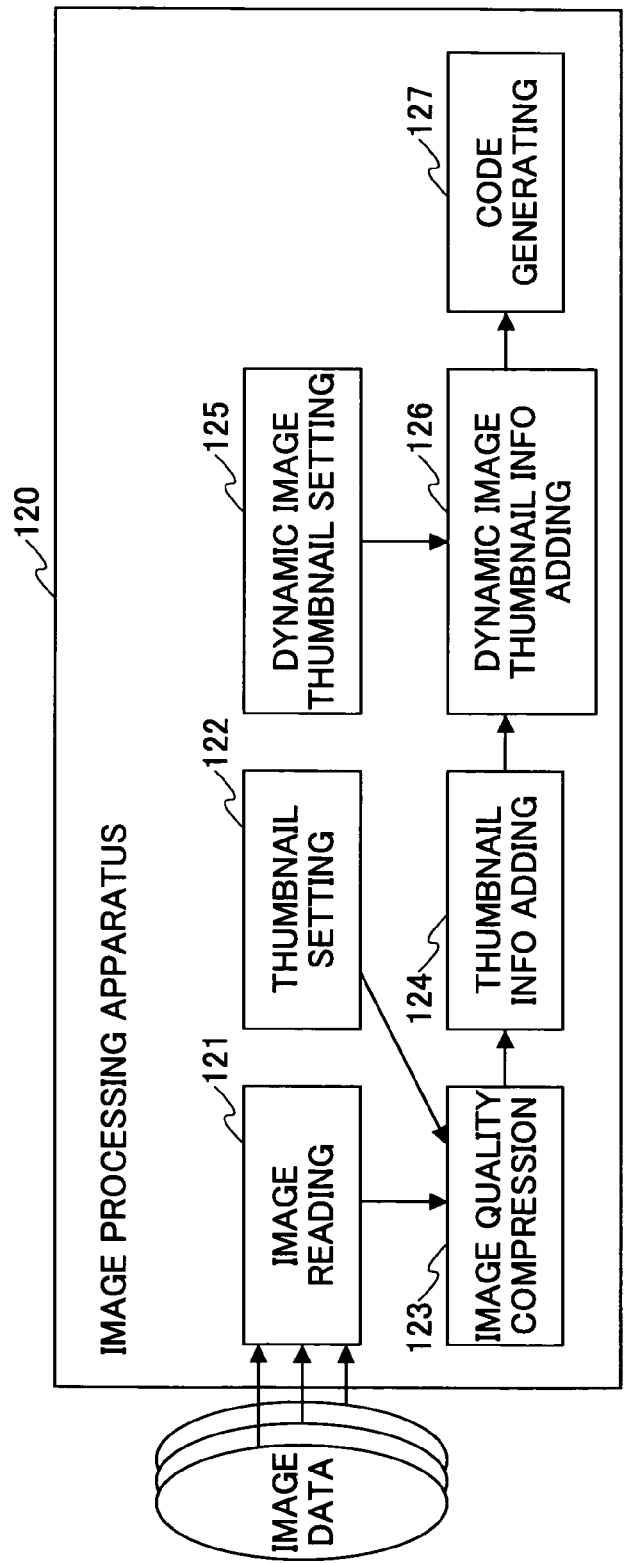
FIG. 19 is a functional block diagram for illustrating one embodiment of the image processing apparatus according to the present invention.
Figure 20:
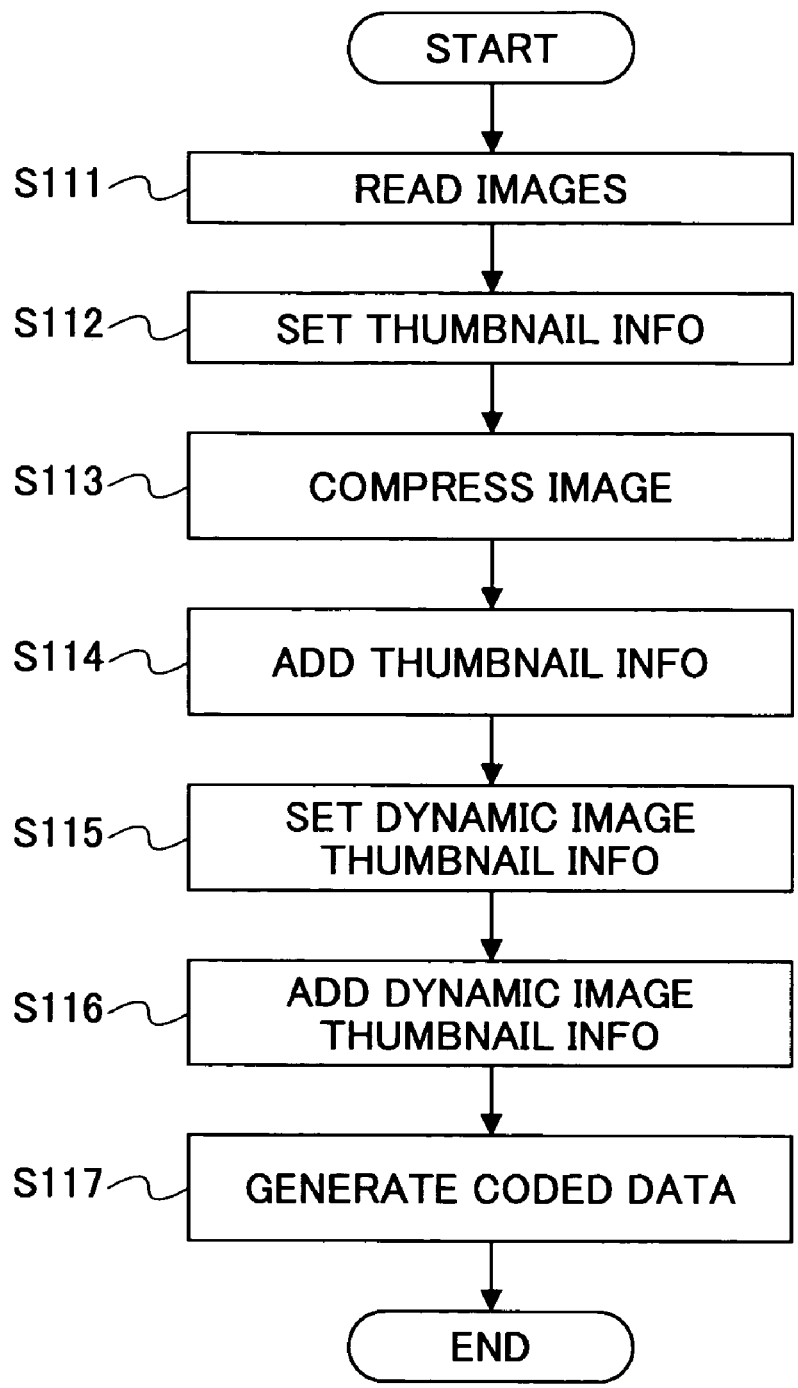
FIG. 20 is a flow chart for illustrating one embodiment of the image processing method according to the present invention, which is carried out by the image processing apparatus shown in FIG. 19.

Next, a description will be given of one embodiment of the image processing apparatus and the image processing method, by referring to FIGS. 19 and 20. FIG. 19 is a functional block diagram for illustrating this embodiment of the image processing apparatus, and FIG. 20 is a flow chart for illustrating this embodiment of the image processing method, that is carried out by the image processing apparatus shown in FIG. 19.

In this embodiment, the image processing apparatus generates a dynamic image file from a plurality of still images, and includes an image sequence setting unit and a data adding unit. The image sequence setting unit sets a reproducing sequence of the plurality of still images. The data adding unit adds, to a header portion of the dynamic image file, data indicating a storage location or the like of each still image according to the set reproducing sequence. In other words, a display time per image can be set by setting a display interval of the still images and the reproducing sequence as a display sequence. The image sequence setting unit may include a dynamic image thumbnail setting unit for setting a still image to be used as a dynamic image thumbnail from the plurality of still images, as dynamic image thumbnail information. The data adding unit may include a dynamic image thumbnail information adding unit for adding the dynamic image thumbnail information set by the dynamic image thumbnail setting unit to the header portion of the dynamic image file.

As a desirable mode of this embodiment, a description will be given of a case where the image processing apparatus is provided with an image compression unit for generating the compressed coded data of the still images. In addition to the image compression unit, this embodiment of the image processing apparatus is provided with the data adding unit that includes a thumbnail setting unit and a thumbnail information adding unit. The thumbnail setting unit sets one or a plurality of formats of the thumbnail information of each still image. The thumbnail information adding unit adds the thumbnail information having the set format to the header portion when forming the encoded data of each still image. The thumbnail information that is added is the information shown in FIG. 7 described above, for example.

In FIG. 19, it is assumed for the sake of convenience that an image processing apparatus 120 is formed by an image reading unit 121, a thumbnail setting unit 122 that includes the thumbnail setting unit, an image quality compression unit 123, a thumbnail information adding unit 124 that includes the thumbnail information adding unit, a dynamic image thumbnail setting unit 125 that includes the image sequence setting unit, a dynamic image thumbnail information adding unit 126 that includes the dynamic image thumbnail information adding unit, and a code generating unit 127.

The image processing apparatus 120 reads still image data of a plurality of still images (or dynamic image data made up of the still image data) by the image reading unit 121 in a step S111 shown in FIG. 20, and sets the thumbnail information by the thumbnail setting unit 122 in a step S112. Of course, the thumbnail information may be set in advance by the thumbnail setting unit 122. Next, the image quality compression unit 123 compresses the still image data in a step S113. The thumbnail information adding unit 124 adds the thumbnail information that is set by the thumbnail setting unit 122, in a step S114.

Next, the dynamic image thumbnail setting unit 125 sets the still image that is to be used as the dynamic image thumbnail, from the plurality of still images, as the dynamic image thumbnail information, in a step S115 shown in FIG. 20. The dynamic image thumbnail information may be set by the user. The dynamic image thumbnail information adding unit 126 adds the dynamic image thumbnail information set by the dynamic image thumbnail setting unit 125 to the header portion (packet header) of the file that groups the image data, in a step S116. Finally, the code generating unit 127 generates the coded data with respect to the dynamic image file, in a step S117.

The steps S114 and S115 may be carried out at arbitrary timings. For example, the steps S114 and S115 may be carried out after the step S111, in order to limit the thumbnail setting, such as limiting creation of the thumbnail only with respect to the still image that is used for the dynamic image thumbnail. Although it is assumed that the thumbnail information adding unit is included in the thumbnail information adding unit 124 and the coded data are generated by the code generating unit 127 after the addition of the thumbnail information, it is of course possible to add the thumbnail information during the generation of the coded data.

According to this embodiment, it is possible to display the dynamic image thumbnail at a high speed. Moreover, it is possible to simultaneously display the thumbnails of the dynamic image and the still image on a single viewer such as a liquid crystal display screen of the camera. Furthermore, although the thumbnail of the image that is taken is a still image in most cases, if a dynamic image is taken and the thumbnail of the dynamic image is obtained, it becomes possible to confirm the kind of video by viewing the dynamic image thumbnail.

The thumbnail information with respect to each still image may be recorded in the comments COM shown in FIG. 10 described above, the file format XML boxes shown in FIG. 11 described above, the file format UUID boxes shown in FIG. 11 described above, and the like, but the recording location is not limited to such. The thumbnail information may be written as follows in the file format XML boxes, similarly as in the case of one embodiment described above.

```
<?xml version="1.0" encoding="Shift-JIS"?>
<!DOCTYPE html
    PUBLIC "-//W3C//DTD XHTML 1.0 Strict//EN"
    "http://www.w3.org/TR/xhtml1/DTD/xhtml1-strict.dtd">
<html xmlns="http://www.w3.org/1999/xhtml" xml:lang="ja" lang="ja">
  <head>
    <title> thumbnail </title>
  </head>
  <body>
    <p>3LL</p>
  </body>
</html>
```

Figure 21:
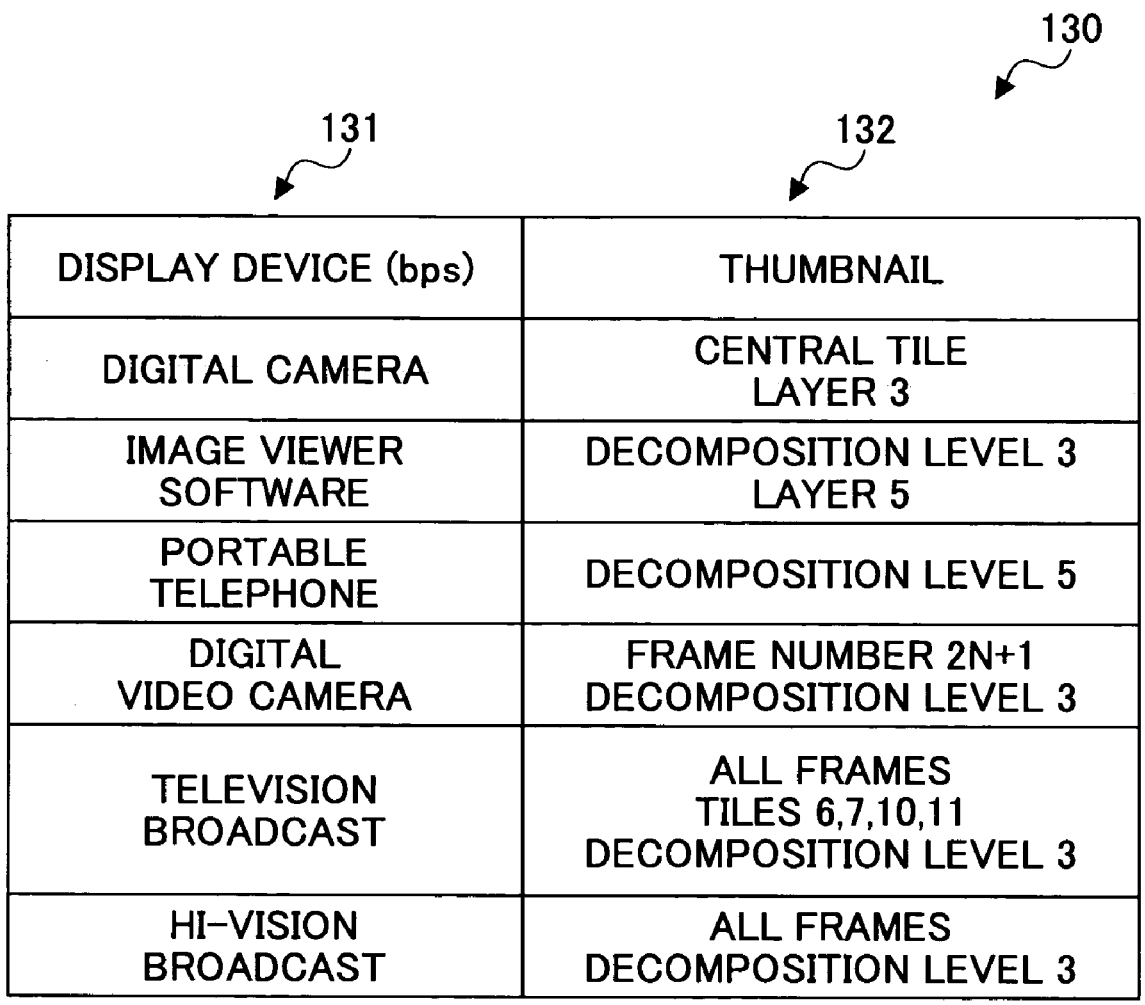
FIG. 21 is a diagram showing thumbnail information set in the image processing apparatus shown in FIG. 19.

FIG. 21 is a diagram showing the thumbnail information set in the image processing apparatus shown in FIG. 19. In the image processing apparatus 120 shown in FIG. 19, any one of the resolution information, the position information, the component information, the picture quality information, and the sub-band information of the image may be used as the thumbnail information of each still image. In addition, a combination of two or more of such information may be used as the thumbnail information.

The decomposition level information may be used as the resolution information. For example, one or a plurality of information selected from tile information, precinct information, code block information and pixel position information may be used as the position information. In addition, layer information and/or bit-plane information may be used as the picture quality information.

The image processing apparatus 120 stores the corresponding relationship, and FIG. 21 shows a correspondence table 130 that is stored as the corresponding relationship of a display device (processing rate, bps) 131 and a thumbnail 132. For example, the central tile and/or the layer 3 may be set with respect to the digital camera. Similarly, the decomposition level 3 and/or the layer 5 may be set with respect to the image viewer software. The decomposition level 5 may be set with respect to the portable telephone. The frame number 2N+1 and/or the decomposition level 3 may be set with respect to the digital video camera. At least one of all frames, the tiles 6, 7, 10 and 11, and the decomposition level 3 may be set with respect to the television (TV) broadcast. All frames and/or the decomposition level 3 may be set with respect to the high-definition (hi-vision) broadcast. The combination of the display device 131 and the thumbnail 132 shown in FIG. 21 is only one example, and the combination is not limited to that shown in FIG. 21. For example, the combination may be appropriately modified depending on the improvements in the processing speed of the display device (or printer or transmitting apparatus).

Figure 22:
FIG. 22 is a diagram showing an original image.

FIG. 22 and FIGS. 23A through 23D are diagrams for illustrating processes carried out by another embodiment of the image output apparatus according to the present invention or one embodiment of the image expansion apparatus according to the present invention. FIG. 22 shows the original image, and FIGS. 23A through 23D show the still images output from one embodiment of the image output apparatus or the image expansion apparatus based on the original image shown in FIG. 22 that is compressed by one embodiment of the image processing apparatus described above.

Figure 23A:
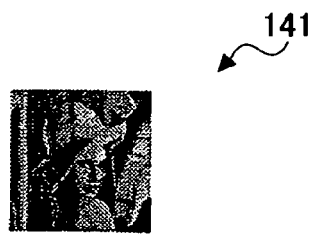
FIGS. 23A through 23D are diagrams for illustrating still images obtained by processing the original image shown in FIG. 22.
Figure 23B:
Figure 23C:
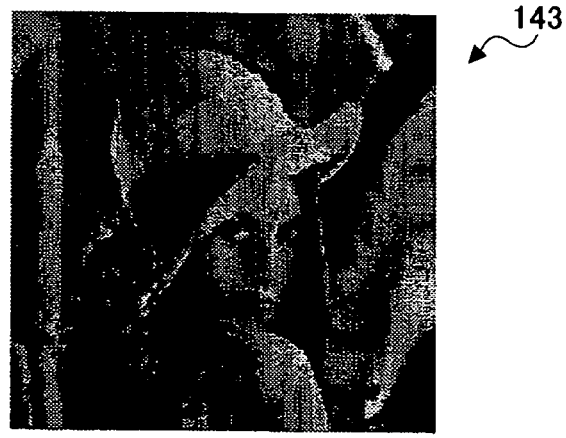
Figure 23D:

When a low-resolution image is specified as the thumbnail with respect to an original image 140 shown in FIG. 22, an image 141 shown in FIG. 23A is output. Similarly, when one component is specified as the thumbnail with respect to the original image 140, an image 142 shown in FIG. 23B is output. When only the layer 0 is specified as the thumbnail with respect to the original image 140, an image 143 shown in FIG. 23C is output. In addition, when the central tile is specified as the thumbnail with respect to the original image 140, an image 144 shown in FIG. 23D is output.

According to this embodiment of the image processing apparatus, it is possible to generate the compressed image data that enables high-speed output of the thumbnail of the image data, with respect to each till image, without increasing the data capacity of the compressed image data. In addition, by recording the thumbnail information having the plurality of formats in the header portion (header information), it is possible to generate a series of compressed coded data that enable thumbnail output in a plurality of formats. Moreover, according to this embodiment of the image output apparatus and the image expansion apparatus, it is possible to output the thumbnail of the image data at a high speed, with respect to each still image, without increasing the data capacity of the input compressed image data. These apparatuses according to one embodiment of the present invention may be applied to an image distribution system or the like that distributes images via one or more networks.

Figure 24:
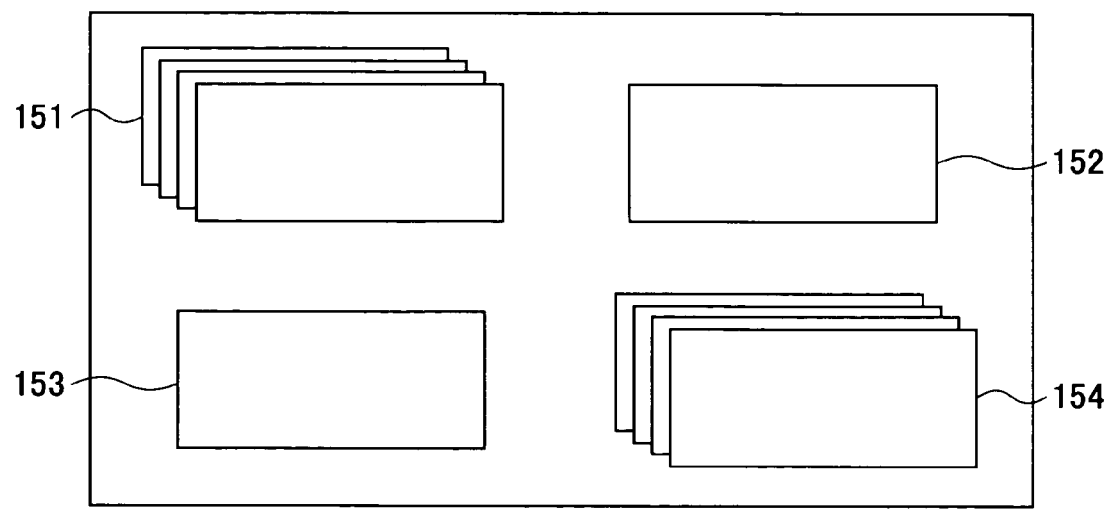
FIG. 24 is a diagram showing a display on an image viewer.
Figure 25:
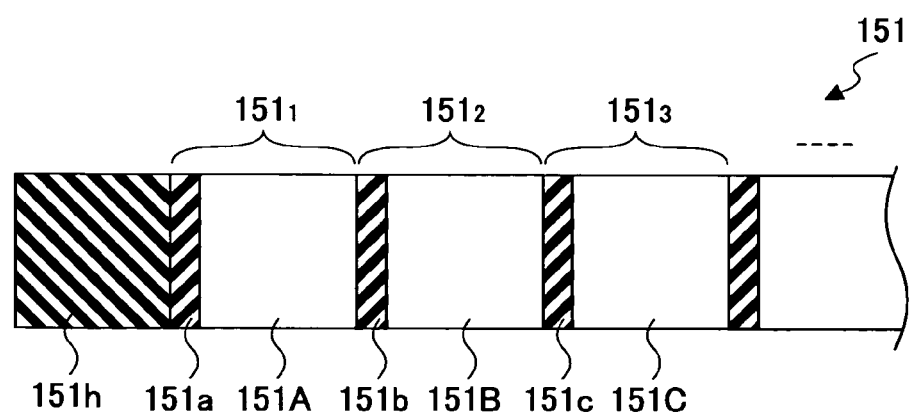
FIG. 25 is a diagram showing a data structure of dynamic image data.
Figure 26:
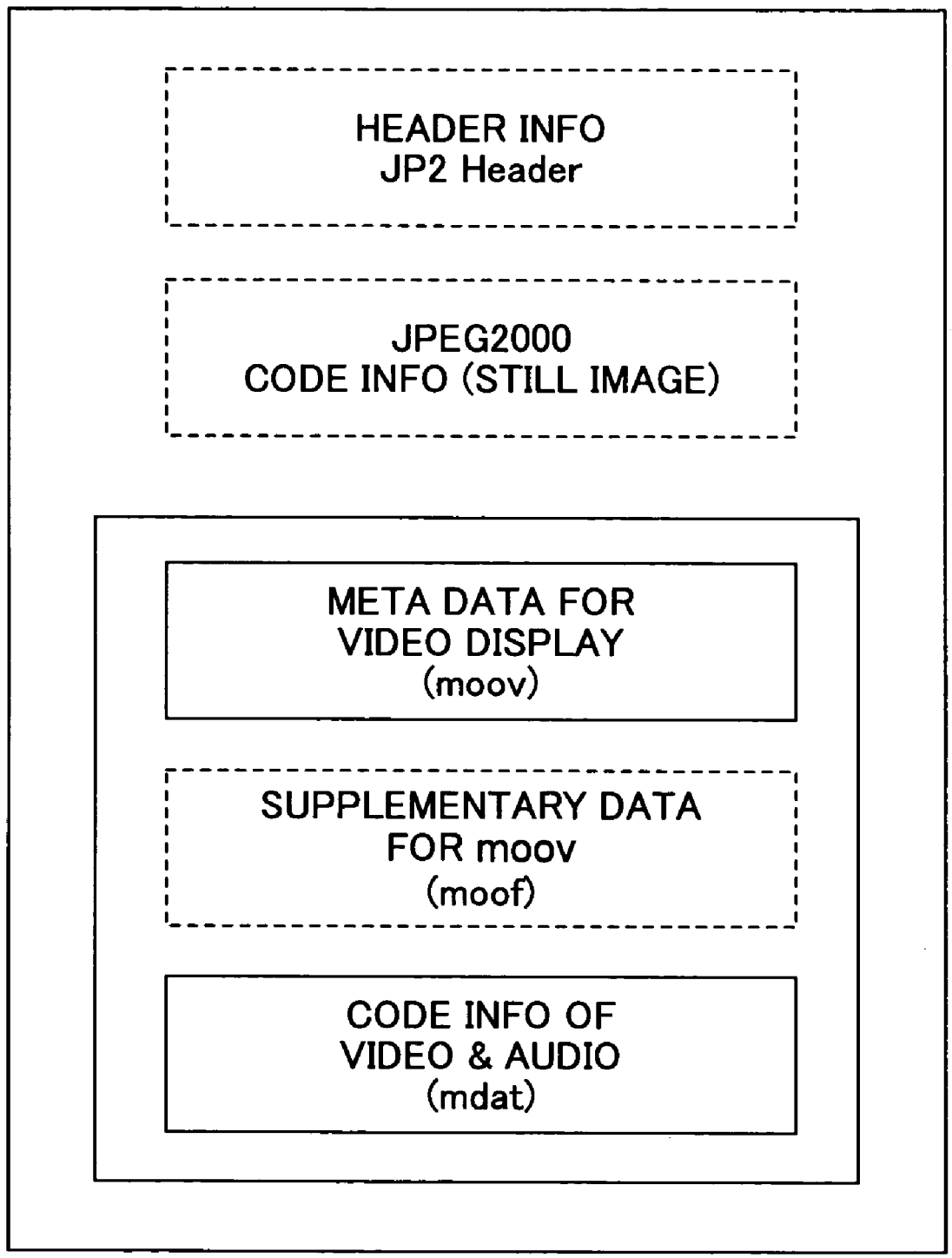
FIG. 26 is a diagram showing a data structure of each still image data of the dynamic image data shown in FIG. 25.

Next, a description will be given of yet another embodiment of the image processing method and apparatus according to the present invention, by referring to FIGS. 24 through 26. FIG. 24 is a diagram showing a display on the image viewer, FIG. 25 is a diagram showing a data structure of the dynamic image data, and FIG. 26 is a diagram showing a data structure of each still image data of the dynamic image data shown in FIG. 25. This embodiment of the image processing apparatus has the same functional structure as that of one embodiment shown in FIG. 19.

In this embodiment, a dynamic image data 151 shown in FIG. 24 that is generated by the image processing apparatus 120 shown in FIG. 19, and the thumbnail of the image is obtained by the image output apparatus. As shown in FIG. 25, the dynamic image data (dynamic image file) 151 has a header portion 151$h$ that includes the dynamic image thumbnail information, and a series of still image data 151$_1$, 151$_2$, 151$_3$, . . . that follow. Each still image data is made up of header information and image data. More particularly, the first still image data 151$_1$ is made up of header information 151$a$ and image data 151A, the second still image data 151$_2$ is made up of header information 151$b$ and image data 151B, and the third still image data 151$_3$ is made up of header information 151$c$ and image data 151C.

As shown in FIG. 26, each still image data includes the header information (JP2 Header), JPEG2000 code information (still image), meta data (moov) for video display, supplementary data (moof) for the meta data (moov), and code information (mdat) of the video and audio.

Another embodiment of the image output apparatus according to the present invention may be provided with an extracting unit for extracting a portion of the compressed coded data, from the series of compressed coded data generated by the image processing apparatus 120, based on the thumbnail information recorded in the header portion of each compressed coded data. This extraction unit not only expands and outputs the thumbnail based on the thumbnail information, but also expands and outputs the reduced image, enlarged image and the like that are other than the original image or the thumbnail. This extraction unit may be designed to analyze the header portion. When outputting the compressed coded data having the thumbnail information recorded in a plurality of formats, the format may be made selectable by the user.

Furthermore, the dynamic image data generated by the image processing apparatus 120 shown in FIG. 19 may be processed by one embodiment of the image expansion apparatus that outputs the thumbnail of the image. This embodiment of the image expansion apparatus may be provided with an expansion and output unit for expanding and outputting only the thumbnail portion of the compressed coded data, from the series of compressed coded data generated by the image processing apparatus 120, based on the thumbnail information recorded in the header portion of each compressed coded data. This expansion and output unit may be designed to analyze the header portion. When outputting the compressed coded data having the thumbnail information recorded in a plurality of formats, the format may be made selectable by the user.

Other embodiments of the image output apparatus may output the file generated by the image processing apparatus 120 according to the reproducing sequence, regardless of whether the image processing apparatus 120 is provided with the compression function (image compression unit). Furthermore, the image output apparatus may output the dynamic image thumbnail of the file generated by the image processing apparatus 120, based on the dynamic image thumbnail information, regardless of whether the image processing apparatus 120 is provided with the compression function.

In any case, it is possible to also output (display, print or transmit) the thumbnail as the dynamic image (dynamic image thumbnail). The dynamic image thumbnail may be made up of a plurality of still images at a predetermined location or, made up of some or all of the still image thumbnails. In the latter case, a high-speed output of the dynamic image thumbnail becomes possible by providing the image compression unit described above. Because the high-speed display of the dynamic image thumbnail is possible, it becomes possible to simultaneously display the dynamic image data 151 and 154 and still image data 152 and 53 on the image viewer in an easily-recognizable and attractive manner, as shown in FIG. 24.

The embodiments of the image processing apparatus, the image output apparatus (including the image display apparatus) and the image expansion apparatus according to the present invention, employ the embodiments of the image processing method, the image output method (including the image display method) and the image expansion method according to the present invention. The methods according to one embodiment of the present invention may be computer-implemented, and the apparatuses according to one embodiment of the present invention may be realized by a computer that functions as the apparatus or functions as each unit of the apparatus.

Another embodiment of the computer-readable storage medium according to the present invention stores a computer program for causing the computer to perform any of the methods according to one embodiment of the present invention, that is, for causing the computer to function as any of the apparatuses according to one embodiment of the present invention. Hence, by executing the program stored in the computer-readable storage medium, the computer can form a system that functions similarly to any of the apparatuses according to one embodiment of the present invention to obtain effects similar to those obtainable by the apparatuses according to one embodiment of the present invention.

The program that causes the computer to perform the image processing, image output (including image display) and/or image expansion, may be stored in any kind of recording media capable of storing the program in a computer-readable manner. The recording medium forming the computer-readable storage medium may be selected from optical recording media such as CD-ROM and DVD-ROM, magneto-optical recording media such as magneto-optical disks, magnetic recording media such as floppy disk (FD), and semiconductor memory devices such as flash memories, ROMs and RAMs. The recording medium may or may not be portable. The program stored in the computer-readable storage medium may be executed by an information processing apparatus including a general-purpose computer such as a personal computer that includes a processor such as a CPU and a storage unit. The program stored in the computer-readable storage medium may be read and executed by the information processing apparatus into which the computer-readable storage medium is loaded. Alternatively, the program may be stored in the computer-readable storage medium that is included within the information processing apparatus, and the program may be read and executed when necessary.

Figure 27:
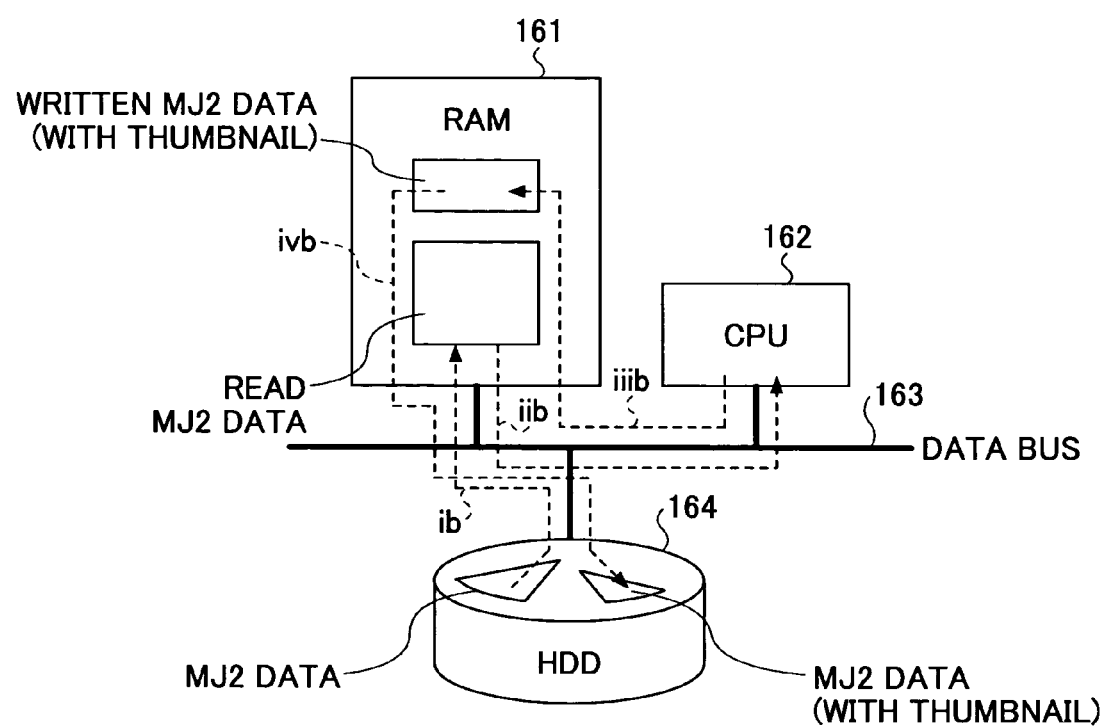
FIG. 27 is a diagram showing a structure of the image processing apparatus.

Next, a description will be given of an apparatus to which one embodiment described above may applied, by referring to FIG. 27. FIG. 27 is a diagram showing a structure of the image processing apparatus. The image processing apparatus shown in FIG. 27 includes a RAM 161, a CPU 162 and a hard disk drive (HDD) 164 that are connected via a data bus 163. The image processing apparatus generates, from the image data (dynamic image data in this case) of the original image, the compressed image data added with the thumbnail information and the dynamic image thumbnail information, and stores the compressed image data in the HDD 164.

The image data of the original image (or compressed image data, and in this case, the dynamic image data of consecutive still images) stored in the HDD 164 are read into the RAM 161 in response to an instruction from the CPU 162, as indicated by ib in FIG. 27. Next, the CPU 162 reads the image data in the RAM 161, obtains wavelet coefficients, and generates the compressed image data by applying the dynamic image or dynamic image and still image thumbnail information adding process of one embodiment of the present invention, as indicated by iib in FIG. 27. The CPU 162 writes the compressed image data, generated, into another region of the RAM 161 as indicated by iiib in FIG. 27. The compressed image data (MJ2 data added with the dynamic image or dynamic image and still image thumbnail information) is stored in the HDD 164 in response to an instruction from the CPU 162, as indicated by ivb in FIG. 27. In the image processing apparatus or the image expansion apparatus, the thumbnail output can be made based on the thumbnail information recorded in the header portion, when outputting the compressed image data (file) for display, printing or transmission. The image processing apparatus shown in FIG. 27 may be used in common as the image output apparatus or the image expansion apparatus. On the other hand, the image output apparatus or the image expansion apparatus may have a structure similar to that of the image processing apparatus shown in FIG. 27.

Further, the present invention is not limited to these embodiments, but various variations and modifications may be made without departing from the scope of the present invention.

What is claimed is:

1. An image processing method for generating a single image group file from a plurality of still images, comprising:
   setting an output sequence of the plurality of still images;
   adding data indicating a storage location of each of the plurality of still images according to the set output sequence, to a header portion of the single image group file; and
   generating compressed coded data of the plurality of still images,
   wherein adding the data comprises:
      setting thumbnail information of each of the plurality of still images in one or more formats; and
      adding the thumbnail information with the set formats in the header portion when forming the coded data of each of the plurality of still images.

2. The image processing method as claimed in claim 1, wherein the thumbnail information includes resolution information of the plurality of still images.

3. The image processing method as claimed in claim 2, wherein the resolution information includes decomposition level information of the plurality of still images.

4. The image processing method as claimed in claim 2, wherein the thumbnail information includes position information of the plurality of still images.

5. The image processing method as claimed in claim 4, wherein the position information includes at least one of tile information, precinct information, code block information and pixel position information.

6. The image processing method as claimed in claim 2, wherein the thumbnail information includes component information of the plurality of still images.

7. The image processing method as claimed in claim 2, wherein the thumbnail information includes picture quality information of the plurality of still images.

8. The image processing method as claimed in claim 7, wherein the picture quality information includes layer information and/or bit-plane information.

9. The image processing method as claimed in claim 2, wherein the thumbnail information includes sub-band information of the plurality of still images.

10. An image processing apparatus for generating a single image group file from a plurality of still images, comprising:
    an image sequence setting unit to set an output sequence of the plurality of still images;
    a data adding unit to add data indicating a storage location of each of the plurality of still images according to the set output sequence, to a header portion of the single image group file; and
    an image compression unit to generate compressed coded data of the plurality of still images,
    the data adding unit comprising
       a thumbnail setting unit to set thumbnail information of each of the plurality of still images in one or more formats; and
       a thumbnail information adding unit to add the thumbnail information with the set formats in the header portion when forming the coded data of each of the plurality of still images.

11. The image processing apparatus as claimed in claim 10, wherein the thumbnail information includes resolution information of the plurality of still images.

12. The image processing apparatus as claimed in claim 11, wherein the resolution information includes decomposition level information of the plurality of still images.

13. The image processing apparatus as claimed in claim 11, wherein the thumbnail information includes position information of the plurality of still images.

14. The image processing apparatus as claimed in claim 13, wherein the position information includes at least one of tile information, precinct information, code block information and pixel position information.

15. The image processing apparatus as claimed in claim 11, wherein the thumbnail information includes component information of the plurality of still images.

16. The image processing apparatus as claimed in claim 11, wherein the thumbnail information includes picture quality information of the plurality of still images.

17. The image processing apparatus as claimed in claim 16, wherein the picture quality information includes layer information and/or bit-plane information.

18. The image processing apparatus as claimed in claim 11, wherein the thumbnail information includes sub-band information of the plurality of still images.

19. An image processing method for generating a single dynamic image file from a plurality of still images, comprising:
    setting a reproducing sequence of the plurality of still images;
    adding data indicating a storage location of each of the plurality of still images according to the set reproducing sequence, to a header portion of the single dynamic image file; and
    generating compressed coded data of the plurality of still images,
    where adding the data comprises:
       setting thumbnail information of each of the plurality of still images in one or more formats; and
       adding the thumbnail information with the set formats in the header portion when forming the coded data of each of the plurality of still images.

20. The image processing method as claimed in claim 19, wherein the thumbnail information includes decomposition level information of the plurality of still images.

21. The image processing method as claimed in claim 20, wherein the resolution information includes a decomposition level information of the plurality of still images.

22. The image processing method as claimed in claim 19, wherein the thumbnail information includes position information of the plurality of still images.

23. The image processing method as claimed in claim 22, wherein the position information includes at least one of tile information, precinct information, code block information and pixel position information.

24. The image processing method as claimed in claim 19, wherein the thumbnail information includes component information of the plurality of still images.

25. The image processing method as claimed in claim 19, wherein the thumbnail information includes picture quality information of the plurality of still images.

26. The image processing method as claimed in claim 25, wherein the picture quality information includes layer information and/or bit-plane information.

27. The image processing method as claimed in claim 19, wherein the thumbnail information includes sub-band information of the plurality of still images.

28. An image processing apparatus for generating a single dynamic image file from a plurality of still images, comprising:
   an image sequence setting unit to set a reproducing sequence of the plurality of still images;
   a data adding unit to add data indicating a storage location of each of the plurality of still images according to the set reproducing sequence, to a header portion of the single dynamic image file; and
   an image compression unit to generate compressed coded data of the plurality of still images,
   wherein the data adding unit comprises:
      a thumbnail setting unit to set thumbnail information of each of the plurality of still images in one or more formats; and
      a thumbnail information adding unit to add the thumbnail information with the set formats in the header portion when forming the coded data of each of the plurality of still images.

29. The image processing apparatus as claimed in claim 28, wherein the thumbnail information includes decomposition level information of the plurality of still images.

30. The image processing apparatus as claimed in claim 29, wherein the resolution information includes a decomposition level information of the plurality of still images.

31. The image processing apparatus as claimed in claim 28, wherein the thumbnail information includes position information of the plurality of still images.

32. The image processing apparatus as claimed in claim 31, wherein the position information includes at least one of tile information, precinct information, code block information and pixel position information.

33. The image processing apparatus as claimed in claim 28, wherein the thumbnail information includes component information of the plurality of still images.

34. The image processing apparatus as claimed in claim 28, wherein the thumbnail information includes picture quality information of the plurality of still images.

35. The image processing apparatus as claimed in claim 34, wherein the picture quality information includes layer information and/or bit-plane information.

36. The image processing apparatus as claimed in claim 28, wherein the thumbnail information includes sub-band information of the plurality of still images.

* * * * *